United States Patent
Kang et al.

(10) Patent No.: US 7,768,955 B2
(45) Date of Patent: Aug. 3, 2010

(54) METHOD AND DEVICE FOR CONNECTING WIRELESS INTERNET SERVICE WITH STRING

(75) Inventors: Moon-Soon Kang, Seongnam-si (KR); Daru Kim, Suwon-si (KR); Eun-Hui Moon, Suwon-si (KR); Gi-Young Yun, Seoul (KR)

(73) Assignee: KT Corporation, Seongnam (KR)

( * ) Notice: Subject to any disclaimer, the term of this patent is extended or adjusted under 35 U.S.C. 154(b) by 994 days.

(21) Appl. No.: 11/485,847

(22) Filed: Jul. 12, 2006

(65) Prior Publication Data

US 2006/0253494 A1    Nov. 9, 2006

Related U.S. Application Data

(63) Continuation of application No. PCT/KR2005/000078, filed on Jan. 11, 2005.

(30) Foreign Application Priority Data

Jan. 13, 2004  (KR) .................... 10-2004-0002146
Jun. 30, 2004  (KR) .................... 10-2004-0050740

(51) Int. Cl.
*H04W 4/00* (2009.01)
(52) U.S. Cl. .................. 370/313; 370/328; 370/338; 455/414.1; 455/422.1
(58) Field of Classification Search ............ 370/313, 370/328, 338; 455/414.1, 422.1
See application file for complete search history.

(56) References Cited

U.S. PATENT DOCUMENTS 5,895,471 A     4/1999  King et al.
2003/0177198 A1*  9/2003  Yabe et al. ................. 709/217

FOREIGN PATENT DOCUMENTS

| | | |
|---|---|---|
| JP | 10-228477 | 8/1998 |
| JP | 2000-020444 | 1/2000 |
| JP | 2001-188802 | 7/2001 |
| JP | 2001-344265 | 12/2001 |
| JP | 2002-77994 | 3/2002 |
| JP | 2002-0099542 | 4/2002 |
| JP | 2003-186771 | 7/2003 |
| JP | 2003-296356 | 10/2003 |
| KR | 10 2000-0018265 | 4/2000 |
| KR | 2002-17684 | 3/2002 |
| KR | 10 2002-0075314 | 10/2002 |
| KR | 2002-76891 | 10/2002 |
| WO | WO 03/025794 A1 | 3/2003 |

OTHER PUBLICATIONS

Korean Intellectual Property Office Preliminary Rejection Letter.

(Continued)

*Primary Examiner*—Nghi H Ly
(74) *Attorney, Agent, or Firm*—Knobbe Martens Olson & Bear LLP

(57) ABSTRACT

A wireless Internet service access method and apparatus thereof is disclosed. In one embodiment, the method eliminates the complexity to access the corresponding site and allows for a mobile terminal to directly access the corresponding site with the use of a special code such as a number or character.

14 Claims, 21 Drawing Sheets

OTHER PUBLICATIONS

International Search Report for PCT/KR2005/000078.

Takizawa Yasmori, "Japanese-capable Web Address Eases Inconvenience of Domain Names Easy to Remember for Advertisement Effect", Nikkei Communication 309$^{th}$ Edition, Nikkei BP, Jan. 3, 2000, pp. 48-49, Abstract only.

Kawai Yashiro, "Real Name" Pervasive for Easy Web Address Many New URLs Easy to Remember gTLD Still in Confusion and Behind, Nikkei Internet Technology 17$^{th}$ Edition, Dec. 1998 issue, Nikkei BP, Nov. 22, 1998, pp. 124-131, Abstract only.

An Office Action for Japanese Application No. 2006-549125 dated Dec. 16, 2008 by Japanese Patent Office, Abstract only.

Office Action for Japanese Patent Application No. 2006-549125 dated Jun. 2, 2009 by Japanese Patent Office.

Toshikazu Fukushima, "Basic technologies and trends of Web search engines: Part 2 The recent topic", Published by Japanese Science and Technology Agency, Office of Science and Technology Information, vol. 46, No. 7, pp. 436-445, Oct. 2003, Abstract only.

Toshikazu Fukushima, "Information Retrieval and Filtering Technologies for Mobile Users", Published by Information Processing Society of Japan, vol. 2002, No. 48, pp. 39-43, May 2002, Abstract only.

Kuwabara et al., "Cross Media Meta-Search System Based on Relaxation of Retrieval Query and Answer Integration", Published by Information Processing Society of Japan, vol. 2003, No. 71, pp. 521-528, Jul. 2003, Abstract only.

Kimura et al., "Hiding of Search Engines Using Distributed WWW Servers", Published by Information Processing Society of Japan, vol. 97, No. 74, pp. 57-64, Jul. 1997, Abstract only.

* cited by examiner http:// # 1 momjjang

FIG. 18

| Function key | magicn | k-merce | Multipack | fimm | GPS | reserved |
|---|---|---|---|---|---|---|
| Function key identifier (corresponding number) | 1 | 2 | 3 | 4 | 5 | 0,6~9 |

FIG. 19

| Function key identifier (Function key) | Corresponding information providing server | Service |
|---|---|---|
| 1(magicn) | Magicn united search server, portal knowledge search server | 1. Magicn united search<br>2. Portal knowledge server |
| 2(k-merce) | k-merce server | k-merce shopping, stock, banking, lottery, gift certificate |
| 3(Multipack) | multipack server | Providing multipack application list and address, downloading application |
| 4(fimm) | fimm server | VOD/AOD contents connection |
| 5(GPS) | Location base service server | Location base service |

METHOD AND DEVICE FOR CONNECTING WIRELESS INTERNET SERVICE WITH STRING

RELATED APPLICATIONS

This application is a continuation application, and claims the benefit under 35 U.S.C. §§120 and 365 of PCT Application No. PCT/KR2005/000078, filed on Jan. 11, 2005, which is hereby incorporated by reference.

BACKGROUND OF THE INVENTION

1. Field of the Invention

The present invention relates to a wireless Internet service access method and apparatus thereof, and more particularly, to a wireless Internet service access method and apparatus thereof for eliminating the complexity to access the corresponding site in many steps and accessing directly the corresponding site with the use of a string.

2. Description of the Related Technology

Currently, in accessing the wireless Internet from a mobile terminal, a user presses a special key indicated as, for example, magicn, ez-i, nate and accesses a wireless portal site. But there is a disadvantage that only the mobile communication company involved in manufacturing the terminal can provide such service. Different wireless portal sites can be accessed only if the user inputs directly an English domain name with the use of a key pad of the mobile terminal. So it is more difficult to access portal sites which are not operated by the mobile communication company.

FIG. 1 illustrates a mobile Internet service method according to the prior art.

In step S110, the user inputs an Internet service request button, in step S115, a corresponding web browser is executed, in step S120, a predetermined web site is accessed. The user has to access the predetermined site first, then the user can access a web site that he wants to visit. That is, in step S130, the user enters a website address of a web server to access, in step S135, the mobile terminal is connected with the web server corresponding to the website.

The above conventional method is inconvenient since the user is required to press buttons several times to access the predetermined site. Moreover, because a user is charged once the web browser is executed, the user pays unnecessary fees before accessing the demanded website.

There are some methods for eliminating such inconvenience and improving the user access of the wireless Internet. Examples of, the methods include accessing the Internet with the use of a number, a call back URL, SMS, a bar code and icon. Here, the call back URL accesses a corresponding site when the URL of the wireless portal is inputted to the short message service (SMS) and the send button is clicked. If the corresponding site transmits the call back URL character message to the terminal of the user, the user may register the received URL in the bookmark and access the web site by way of the bookmark.

However, because such methods receive access information from an external (separate) apparatus and store the received access information in the terminal, the terminal cannot access directly the Internet site with the use of such methods.

So, the conventional wireless Internet service access method is complicated and requires unnecessary time and fees.

SUMMARY OF CERTAIN INVENTIVE ASPECTS

One aspect of the present invention provides an Internet service access method and an apparatus thereof for eliminating the complexity to access the corresponding site in many steps and accessing the wanted site with the string.

Another aspect of the present invention provides a service for eliminating the unnecessary fee of the user for accessing the wanted web page, by providing the URL information of the wanted site with string and accessing directly the web page for providing the wanted contents or the wanted web page.

Another aspect of the present invention provides a method and an apparatus for accessing the site wanted by the user by analyzing the string inputted by the user or accessing the wanted site in one or two operations of the button by the information about the corresponding site.

Another aspect of the present invention provides an access service corresponding to a location base service (LBS)

Another aspect of the present invention provides a wireless Internet service access method and an apparatus for eliminating the complexity to access the corresponding site in many steps and accessing directly the wanted site and information with the string and the function key in terminal.

Another aspect of the present invention provides a wireless Internet service access method and apparatus thereof for providing the information wanted by the user faster and more easily by providing other information or the information of other priority according to the wireless Internet access function key inputted by the user though the string inputted by the user is the same.

Another aspect of the present invention provides a wireless Internet service access method and an apparatus thereof for accessing directly the information corresponding to the function key inputted by the user, that is, the information corresponding to the function key for special object.

Still another aspect of the present invention provide a method of accessing an Internet service by an Internet service access server coupled with a plurality of mobile terminals through a network, comprising: (a) receiving an Internet access service request signal including a string from the mobile terminal, (b) extracting the string from the Internet access request signal, (c) determining the type of the Internet access service request signal by employing an identifier included in the string, wherein the Internet access request signal comprises an access request signal and a search request signal, (d) if the Internet access request signal is the access request signal, requesting an URL information request signal including the string to a string DNS server and receiving URL information corresponding to the string from the string DNS server, (e) if the Internet access request signal is the search request signal, requesting the URL information request signal including the string to a search server and receiving the URL information corresponding to the string from the search server, and (f) transmitting the URL information to the terminal.

Still another aspect of the present invention provides a method of accessing an Internet service by a mobile terminal coupled with an Internet service access server through a network, comprising: recognizing a string input mode conversion signal corresponding to a string input mode conversion button operation by an user, outputting a string input mode screen corresponding to the string input mode conversion signal, recognizing the button operation corresponding to the string inputted by the user in the string input mode screen and outputting the string corresponding to the button operation in the screen, producing an Internet service request signal including the string corresponding to a service request button operation by the user in the string input mode screen, transmitting the Internet service request signal to the Internet service access server, and receiving the URL information corresponding to the string from the Internet access apparatus.

In one embodiment, the string comprises at least one of an identifier, access information and search information, and the search information comprises at least a search word of a search word and an operator.

In one embodiment, the search information further comprises a search field.

In one embodiment, in the step (c), if the identifier is included in the string, the Internet access request signal is recognized as an access request signal, if not, the Internet access request signal is recognized as a search request signal.

In one embodiment, the step (d) further comprises: extracting the string included in the URL information request signal by a code analysis part included in the string DNS server, and extracting the URL information corresponding to the string from an address registering part included in the DNS server by the code analysis part.

In one embodiment, the step (e) further comprises: extracting a search word included in the string, searching URL information corresponding to the search word, and producing a search list included the URL information.

In one embodiment, if the string includes a search field, search is performed for only the field corresponding to the search information.

In one embodiment, the method further comprises: receiving location information of the terminal, and extracting only search information corresponding to the location information of the terminal from the search list.

In one embodiment, the URL information of the step (f) is transmitted with being included in web page or search list corresponding to the URL information.

Still another aspect of the present invention provides an apparatus for accessing an Internet service coupled with a plurality of mobile terminals through a network, comprising: a proxy server for receiving an Internet access service request signal including a string from the mobile terminal, extracting the string from the Internet access request signal, and transmitting URL information corresponding to the string to the mobile terminal, an URL information extracting part, included in the proxy server, for determining type of the Internet access service request signal by employing a identifier included in the string, wherein the Internet access request signal comprises an access request signal and a search request signal, and an URL information providing part, included in the proxy server, for transmitting the URL information to the mobile terminal and reaccessing the mobile terminal to a web page corresponding to the URL information again or calling the web page corresponding to the URL information and transmitting it to the terminal.

In one embodiment, the apparatus further comprises a string DNS server for extracting URL information corresponding to the string if the Internet access request signal is the access request signal, wherein the string DNS server comprises an address registering part for the storing the URL information corresponding to the string and a code analysis part for extracting the URL information corresponding to the string from the address registering part.

In one embodiment, the string comprises at least one of an identifier, access information and search information, and the search information comprises at least search word of a search word and an operator.

In one embodiment, the search information further comprises a search field.

In one embodiment, the URL information extracting part, if the identifier is included in the string, recognizes the Internet access request signal as an access request signal, if not, recognizes the Internet access request signal as a search request signal.

Yet another aspect of the invention provides a method of accessing a wireless Internet service by one or more servers coupled with a mobile terminal including a plurality of wireless Internet access keys through a network, comprising: receiving a wireless Internet access service request signal including a predetermined service distinguisher, a string and the information corresponding to the wireless Internet access key from the mobile terminal, determining whether or not the predetermined service distinguisher is included in the wireless Internet service access request signal, extracting the string and the information corresponding to the wireless Internet access key if the predetermined service distinguisher is included in the wireless Internet service access request signal, obtaining information corresponding to the string, reorganizing the obtained information according to priority based on information corresponding to the wireless Internet access key, and transmitting the reorganized information to the mobile terminal.

In one embodiment, the information corresponding to the wireless Internet access key is a numeral or a character.

In one embodiment, the step of obtaining information corresponding to the string comprises extracting the information corresponding to the string from a database in the server.

In one embodiment, the step of obtaining the information corresponding to the string comprises: requesting the information corresponding to the string to one or more information providing server coupled to the server, and receiving the information corresponding to the string from the one or more information providing server.

In one embodiment, the step of reorganizing the obtained information according to priority based on information corresponding to the wireless Internet access key comprises organizing the information, except the determined information belonging to the priority level, as directory.

In one embodiment, with multimedia data corresponding to the inputted wireless Internet access key, the reorganized information is provided to the user through the mobile terminal.

In one embodiment, the multimedia data comprise at least one chosen from an image, a sound and a perfume.

Yet another aspect of the invention provides a method of accessing a wireless Internet service by one or more server coupled with a mobile terminal including a plurality of wireless Internet access keys through a network, comprising: receiving a wireless Internet access service request signal including a predetermined service distinguisher, a string and a wireless Internet access key identifier from the mobile terminal, determining whether or not the predetermined service distinguisher is included in the wireless Internet service access request signal, extracting the string and the wireless Internet access key identifier if the predetermined service distinguisher is included in the wireless Internet service access request signal, requesting the information corresponding to the string to the information providing server corresponding to the wireless Internet access key identifier, receiving the information corresponding to the string from the information providing server, and transmitting the information corresponding to the string or the information organized from the information corresponding to the string to the mobile terminal.

In one embodiment, the wireless Internet access key identifier is a numeral or a character.

In one embodiment, the method further comprises reorganizing the information corresponding to the string received from the information providing server according to a predetermined priority.

In one embodiment, the information providing server is preferentially corresponding to any one out of a plurality of wireless Internet access function keys.

Yet another aspect of the invention provides a method of accessing a wireless Internet service by a mobile terminal including a plurality of wireless Internet access keys through a network, comprising: being converted into a string input mode according to the operation of string mode conversion key by a user, recognizing the button operation corresponding to the string inputted in the string input mode by the user, recognizing an input of the corresponding wireless Internet access key if any one out of the a plurality of the a plurality of wireless Internet access keys is inputted by the user, producing a transmission code for requesting the wireless Internet service access according to the string and the wireless Internet access key inputted by the user, wherein the transmission code comprises a predetermined service distinguisher, the string and a wireless Internet access key identifier corresponding to the wireless Internet access key, transmitting a wireless Internet service access request signal including the transmission code to an analysis server through a gateway server, and receiving the string and the information corresponding to the wireless Internet access key identifier from the analysis server.

In one embodiment, the wireless Internet access key identifier is a numeral or a character.

In one embodiment, the method further comprises providing multimedia data corresponding to the wireless Internet access key identifier to the mobile terminal.

In one embodiment, the multimedia data comprise at least one chosen from an image, a sound and a perfume.

In one embodiment, with the information received from the analysis server, the multimedia data is provided to the mobile terminal.

Further another aspect of the invention provides a computer-readable medium including a program containing computer-executable instructions for performing the method for accessing a wireless Internet service as stated in any of the preceding methods Further another aspect of the invention provides a system for providing a wireless Internet access service coupled with a mobile terminal including a plurality of wireless Internet access function keys through a network, comprising: a gateway server for receiving a wireless Internet access service request signal including a predetermined service distinguisher, a string and a wireless Internet access key identifier from the mobile terminal and determining whether or not the predetermined service distinguisher is included in the wireless Internet service access request signal, and an analysis server for receiving the string and the wireless Internet access key identifier from the gateway server and providing the string and the information corresponding to the wireless Internet access key identifier to the mobile terminal, wherein the analysis server comprises a string extracting part for extracting the string and the wireless Internet access key identifier, and an information organizing part for obtaining the information corresponding to the string and reorganizing the obtained information according to priority based on the wireless Internet access key identifier.

In one embodiment, the analysis server further comprises a transmitting/receiving part for requesting the information corresponding to the string to one or more information providing server coupled with the system for providing a wireless Internet access service and receiving it from the one or more information providing server and providing it to the information organizing part.

BRIEF DESCRIPTION OF THE DRAWINGS

Embodiments of the present invention will be described in conjunction with the accompanying drawings.

FIG. 18 illustrates a code for a numeral corresponding to the each function key if a function key identifier is a numeral.

FIG. 19 illustrates an information providing server corresponding to each function key and a code for the type of the information provided from each information providing server.

DETAILED DESCRIPTION OF CERTAIN INVENTIVE EMBODIMENTS

For convenience, two exemplary embodiments are disclosed. The first embodiment is an access method to the wireless Internet using a string, and the other is an access method to the wireless Internet using a string and a wireless Internet access function key.

A First Embodiment

Figure 1:
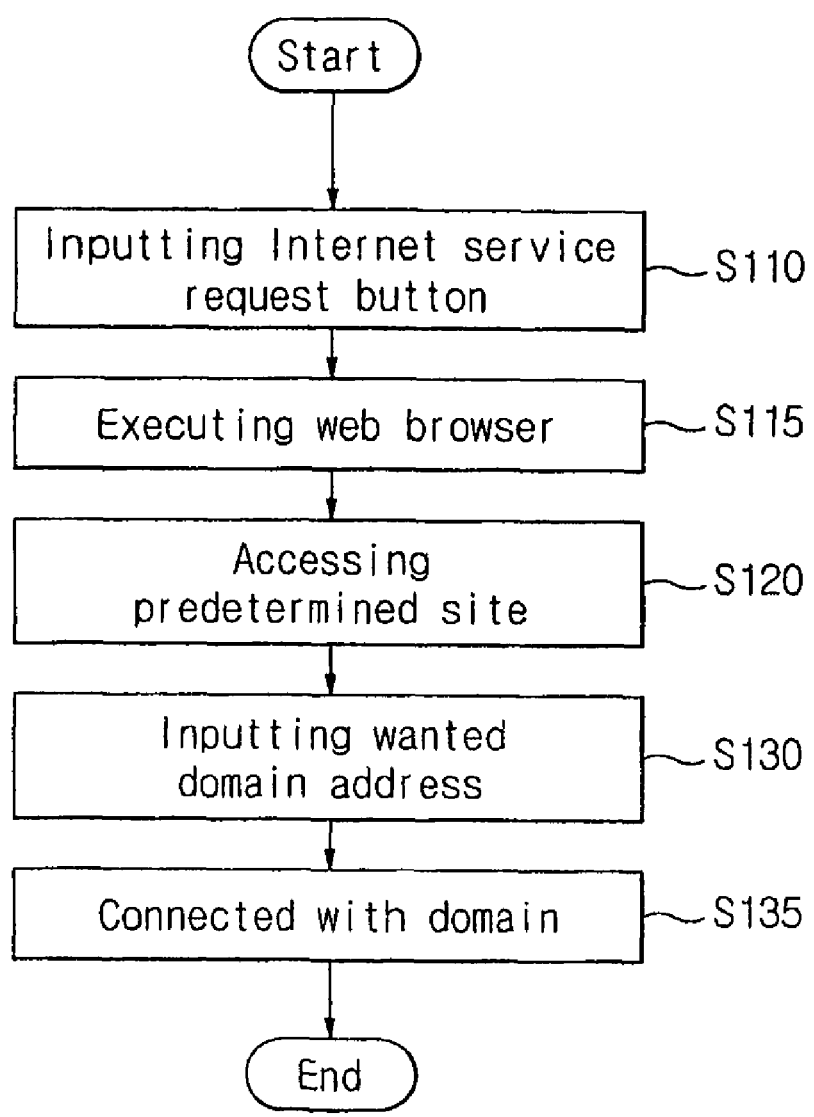
FIG. 1 illustrates a mobile Internet access method according to the prior art.
Figure 2:
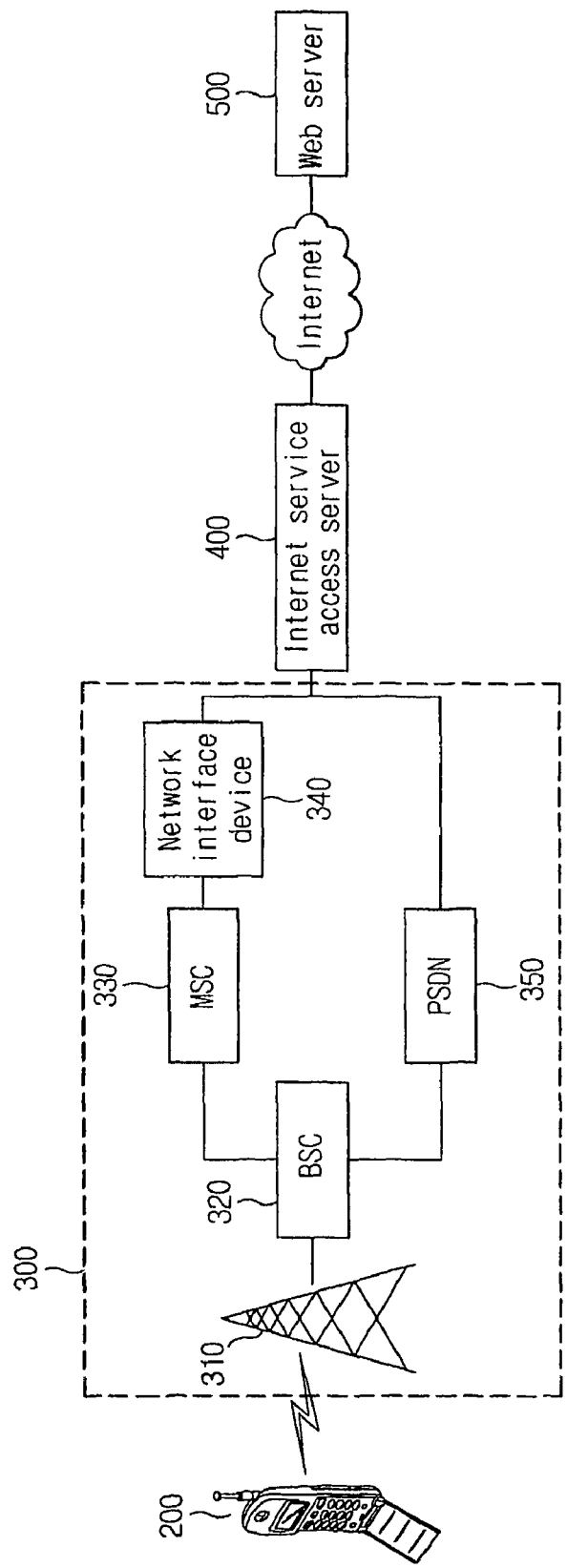
FIG. 2 illustrates an Internet service access system with string according to one embodiment of the present invention.
Figure 3:
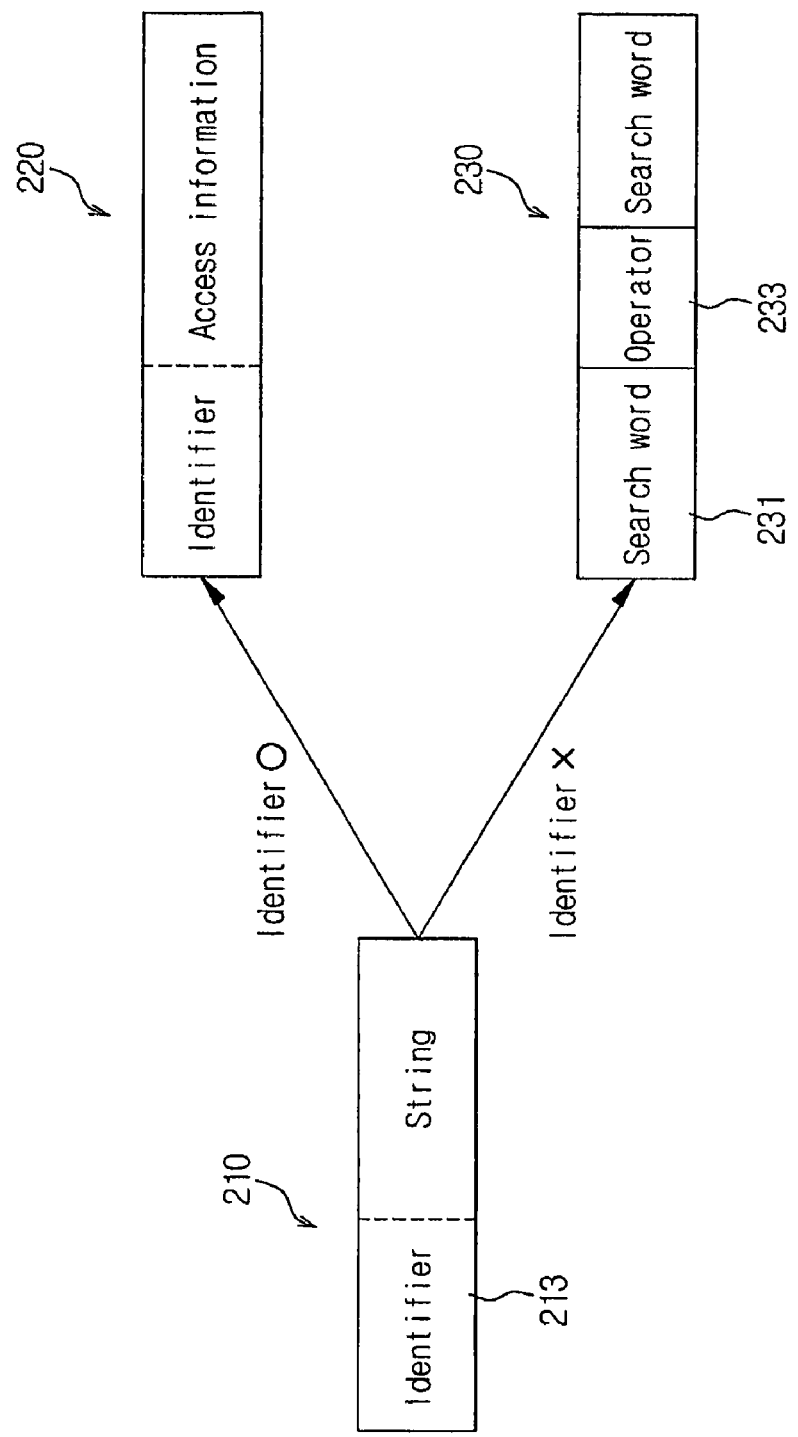
FIG. 3 illustrates the data configuration of the string according to one embodiment of the present invention.

Referring to FIGS. 2-13, the first embodiment will be described. FIG. 2 illustrates the Internet service access system using string according to one embodiment of the present invention, FIG. 3 illustrates a configuration of string according to one embodiment of the present invention.

First, referring to FIG. 2, the string access system comprises a network access part (300) and an Internet service access server (400), a mobile terminal (200) may a access web server (500) through the string access system.

Here, the network access part (300) has the mobile terminal (200) access the Internet service access server (400). The network access part (300) comprises BTS (Base Transceiver System, hereinafter referred to as 'BTS') (310), BSC (Base Station Controller, hereinafter referred to as 'BSC') (320), MSC (Mobile Service Switching Center, hereinafter referred to as 'MSC') (330), network interface device (340) and PDSN (350), and the network access part (300) may further comprise a location information providing server which is not shown in FIG. 2. The location providing server may be a separate component or coupled with MSC. The location information providing server, which is not shown in FIG. 2, stores location information of the mobile terminal (200). That is, the location providing server stores BTS identifiers and the like transmitted from the mobile terminal (200) as location information and transmits such location information of BTS identifiers and the like to corresponding service server corresponding to the request of another service server.

The mobile terminal (200) is a terminal that may provide Internet services. The signal transmitted from the mobile terminal (200) is received at the BTS (310) and transmitted to the MSC (330) through the BSC (320). This mobile terminal (200) comprises a string input layer module or a web browser module and performs the service corresponding to the string input The network interface device (340) couples a voice communication network and a data communication network and matches the protocols of other communication networks. A PDSN (Packet Data Service Node) is for the third generation packet data communication network service and the mobile terminal (200) may access the Internet service access server (400) through the BSC (350)

The Internet service access server (300) extracts the URL information corresponding to the string which is inputted at the terminal and provides a service to have the mobile terminal (200) access the corresponding web server or provides a search list corresponding to the string. With the web site information according to this string, the access service according to location information may be provided, and the web server (400) provides various document information and multimedia information through the web browser of the mobile terminal (200).

The Internet access service server (330) analyzes the Internet access request signal received from a predetermined mobile terminal, classifies it into an access signal and a search signal according to a predetermined method and provides the access service according to classified result.

Hereinafter, referring to FIG. 3, the configuration of the string according to one embodiment of the present invention is described.

The string may comprise a predetermined identifier to determine whether it is the information for accessing the corresponding web page or searching an appropriate web page corresponding to the string. So the string (210) may further comprise an identifier (213). In another embodiment, after determined to be the information for web site access, if there is no corresponding web page, the string is determined to be the information for search service.

Here, in case the string requests web page access, the string except the identifier is referred to as access information (220), and in case the string requests search, the string may comprise a search word (231) or an operator (233). Here, in case the string is the search information, the string data structure may comprise a search field, an operator, and a search word sequentially. For example, if anyone wants to reserve a movie, the string data is inputted in the form of 'reserve * matrix' and thus, only the predetermined search field is searched, whereby it may increase the efficiency of the search service.

Figure 4:
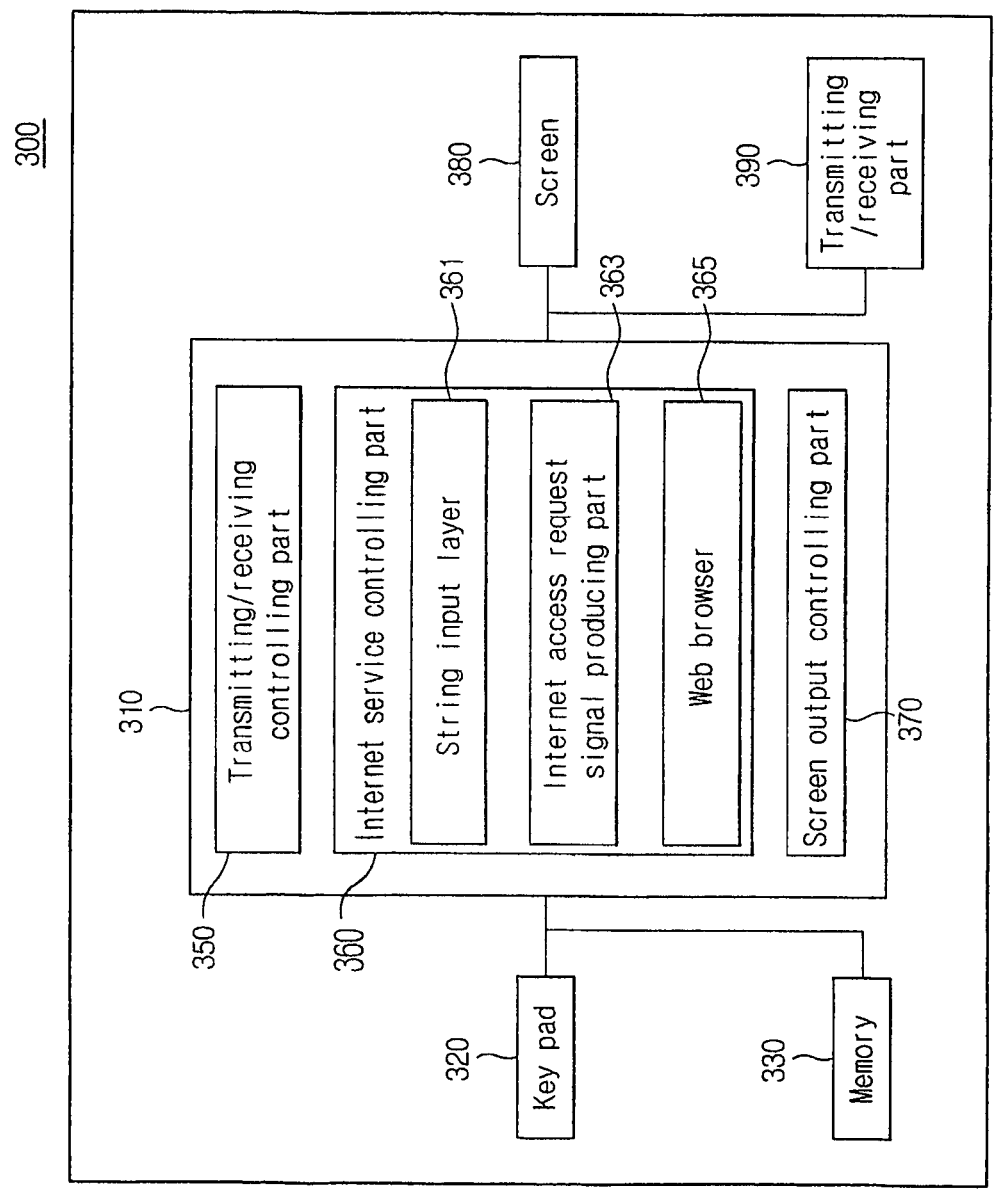
FIG. 4 illustrates the configuration of the terminal for providing the Internet service access method with string according to one embodiment of the present invention.

FIG. 4 shows a configuration of the terminal for providing an Internet service access method by employing the string according to one embodiment of the present invention.

The mobile terminal may comprise a key pad (320), a memory (330), a controlling part (310), a screen (380) and a transmitting/receiving part (390). Here, the controlling part (310) comprises a transmitting/receiving controlling part (350), an Internet service controlling part (360) and a screen output controlling part (370).

The key pad (320) comprises a button corresponding to the string input mode conversion function to convert to a string input mode in order to input the string at mobile terminal.

The memory (330) stores a web browser, an address list, a program performing the controlling function and the like. In the above, the key pad (320) produces unique signals according to the operation of each of such buttons. The controlling part (310) recognizes such signals generated from key pad (320) and performs the controlling function corresponding to the signals. For example, if the signal generated from the key pad (320) is a string input mode conversion signal, the string input mode conversion screen is outputted through the screen output controlling part (370), and if the signal is an Internet service access request signal, the web browser stored in the memory (330) is driven.

According to such Internet service access request signal, the Internet service controlling part (360) drives the web browser stored in the memory (330), and outputs the web browser on screen (380) by employing the screen output controlling part (370), and transmits the string to the Internet access service server by employing the transmitting/receiving controlling part (350) and the transmitting/receiving part (390). After receiving the result data from the Internet access service server by employing the transmitting/receiving part (390) and transmitting/receiving controlling part (350), it outputs them on the screen (380) by employing the screen output controlling part (370).

The Internet service controlling part according to one embodiment of the present invention comprises a string input layer module (361), a web Internet access request signal producing part (363) and a browser module (365).

The string input layer module (361) is executed by the string input mode conversion signal produced corresponding to the operation of string input mode conversion button by user. Such string input layer module (361) outputs the string input mode screen as interface to the mobile terminal so that the user may input string through that. Also, after the user inputs the string through the string input layer module (361), the Internet access request signal producing part (363) produces the Internet access request signal according to the operation of the service request button. For example, if the user inputs the string through the string input mode screen outputted by the string input layer module (361) and operates the service request button, the string input layer module (361) recognizes inputted string and service request button, goes into the step that produces the Internet access request signal corresponding to the service request button.

If the user inputs the string and operates the service request button, the Internet access request signal producing part (363) produces Internet access request signal corresponding to the predetermined data and provides the service corresponding to the access request and search request.

Figure 5:
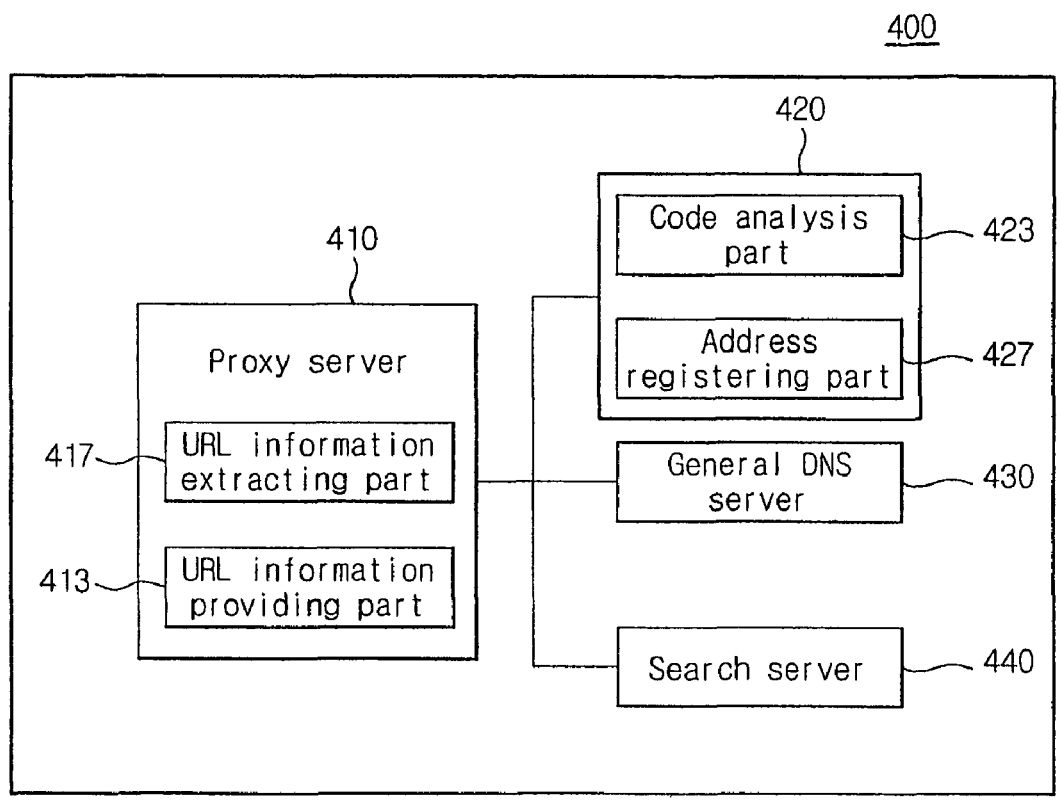
FIG. 5 illustrates the configuration of an Internet service access server for providing the Internet service access method with string according to one embodiment of the present invention.

FIG. 5 illustrates the configuration of the Internet service access server for providing the Internet service access method by employing the string according to one embodiment of the present invention.

The Internet service access server (400) may comprise a proxy server (410), a string DNS server (420), a general DNS server (430) and a search server (440).

The proxy server (410) according to one embodiment of the present invention extracts the string from the Internet access request signal received from the terminal and transmits detailed URL information corresponding to the string to the terminal. If the proxy server (410) receives the string including the domain name or the URL information according to the prior art, it accesses the general DNS server (430), and if it receives the Internet access request signal including the string that cannot be recognized at the conventional DNS server, the string DNS server (420) or the search server (440) provides the Internet access service. Hereinafter, the Internet access method by employing the general DNS server (420) according to the prior art is obvious to those skilled in the art, therefore, further description will not be made.

The proxy server (410) may comprise an URL information extracting part (413) and an URL information providing part (417). The method for providing the Internet access service by the URL information providing part (417) may be divided into the following two types.

TABLE 1

| Category | Operation |
|---|---|
| URL transmission | Providing the URL information of the site corresponding to the string |
| page transmission | Providing the page by calling the page of the URL information |

The Internet access service may be provided by that, the proxy server (410) extracts the detailed URL information and transmit it to the terminal and the terminal accesses the corresponding URL, or the proxy server (410) calls the page corresponding the URL and directly provide it to the terminal. Here, since the provided page information includes the corresponding URL, the information transmitted to the terminal regardless of the providing method is referred to as URL information.

In one embodiment, the URL information extracting part (413) extracts the detailed URL information corresponding to the string and analyzes the string and provides the detailed URL information. The URL information extracting part (413) may determine whether the string is the signal for accessing a specific site or the signal for requesting a search list by employing the string information and provide the Internet access service according to the determined result. In the following table 2, the method for extracting the detailed URL information by analyzing the code according to one embodiment of the present invention is provided.

TABLE 2

| Category | Operation | Comments |
|---|---|---|
| access request | Requesting to the string DNS server to extract the URL information of the site corresponding to the string | http://, *, http://* |
| search request | Requesting to the search server to extract a search list by employing the string as a search keyword | Able to use a logic operator |

The URL information extracting part (413) determines whether the Internet access request signal is the access request signal or search request signal by employing a predetermined identifier. Here, to identify the signal, each separate identifier (for example, a access identifier and a search identifier) can be used or only one identifier for one request signal can be used. Hereinafter, the case that the access identifier is used only for the access request signal is described.

For example, in case user want to access the KTF (that is, Korean mobile communication company), if the string included in the Internet access request signal includes a predetermined identifier and the site name to be accessed (for example, http://KT, *KT, http://*KT), the signal is recognized as the access request signal and the string information is transmitted to the string DNS server (420) according to one embodiment of the present invention. The string DNS server (320) outputs a domain address corresponding to the string. For example, if "KTF" is inputted into the DNS server (320) as string, a domain address "http://www.ktf.com" of the web server is outputted.

On the other hand, if the string does not include a predetermined access identifier, the signal is recognized as the search request signal, the string information is transmitted to the predetermined search server, and the search server extracts the search result corresponding to the string information.

Here, the string for search may also include a predetermined format. For example, the string for search comprises a search field, an operator and a search word sequentially and the search field can be limited by referring to the search field and thus, search can be efficiently conducted only in the area corresponding to the search field by using a search word. Here, it is obvious that the search field may be determined by predetermined categories as stock, search, location information and the like. For example, if a user wants to reserve a movie, the string is inputted by the form of 'reservation * matrix' and only the predetermined search field is searched. Therefore the search efficiency may increase. Also, the reservation can be made more easily by providing the detailed URL information for reserving the matrix. If the string is 'search * jamaica', the 'jamaica' is searched and the detailed information about 'jamaica' is transmitted to the user.

And if the location information is inputted into the search field, only the search result corresponding to the location of the terminal is extracted and provided. For example, if the string includes only 'flower delivery', the search list corresponding to the flower delivery is extracted and provided, the URL information corresponding to the search result may be provided. Further even if the separate location information is not inputted, the location of the terminal is pursued and only the search list corresponding to the location of the terminal may be extracted and provided.

If receiving the access request signal, the string DNS server (420) may provide the detailed URL information corresponding to the string and comprise a code analysis part (423) and further comprise an address registering part (427). The code analysis part (413) extracts the detailed URL information from the received string information by employing the address registering part (427). The address registering part (427) organizes, stores and manages the string information and the mapping code of the detailed URL information.

Figure 6:
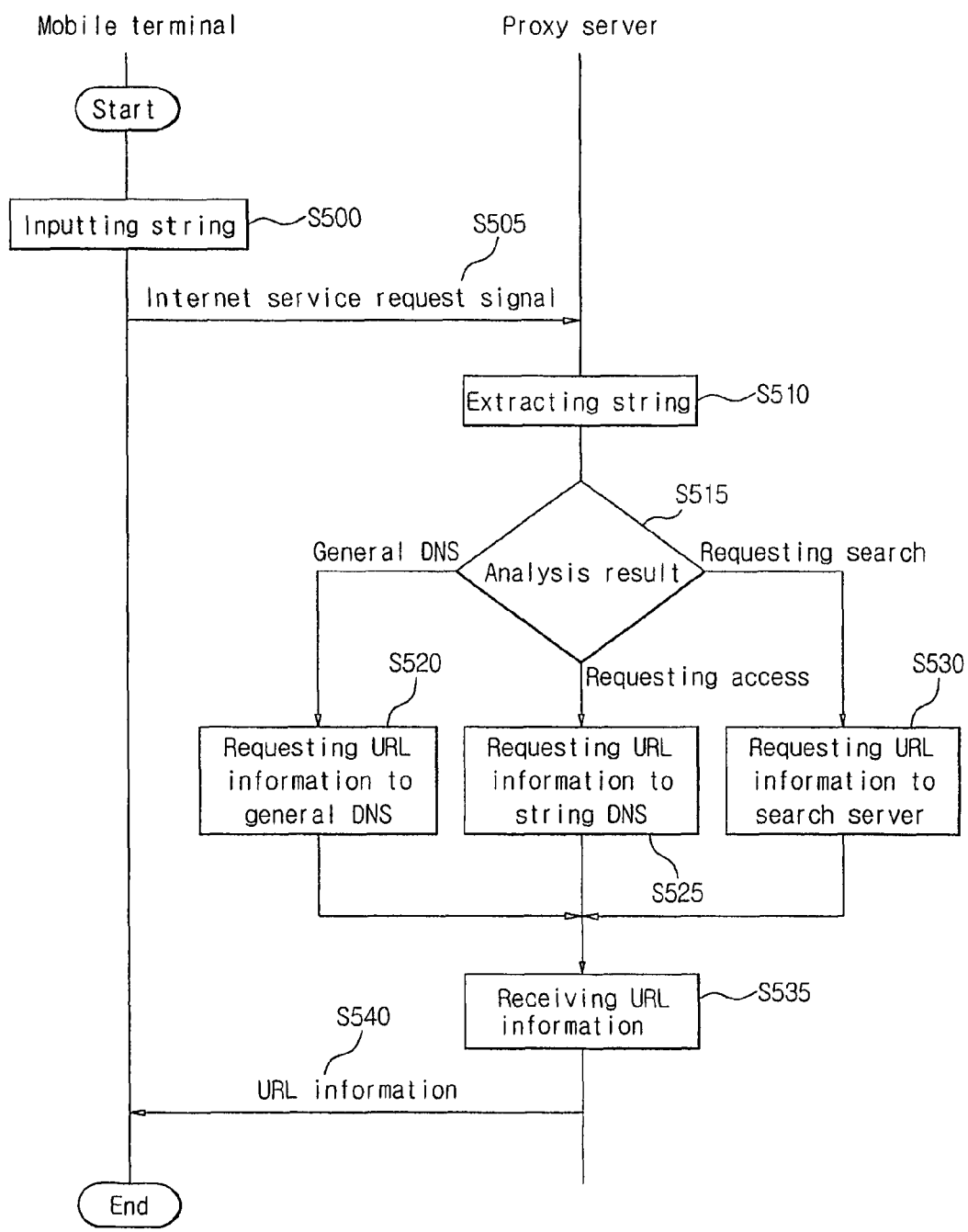
FIG. 6 illustrates an Internet service access process with string according to one embodiment of the present invention.
Figure 7:
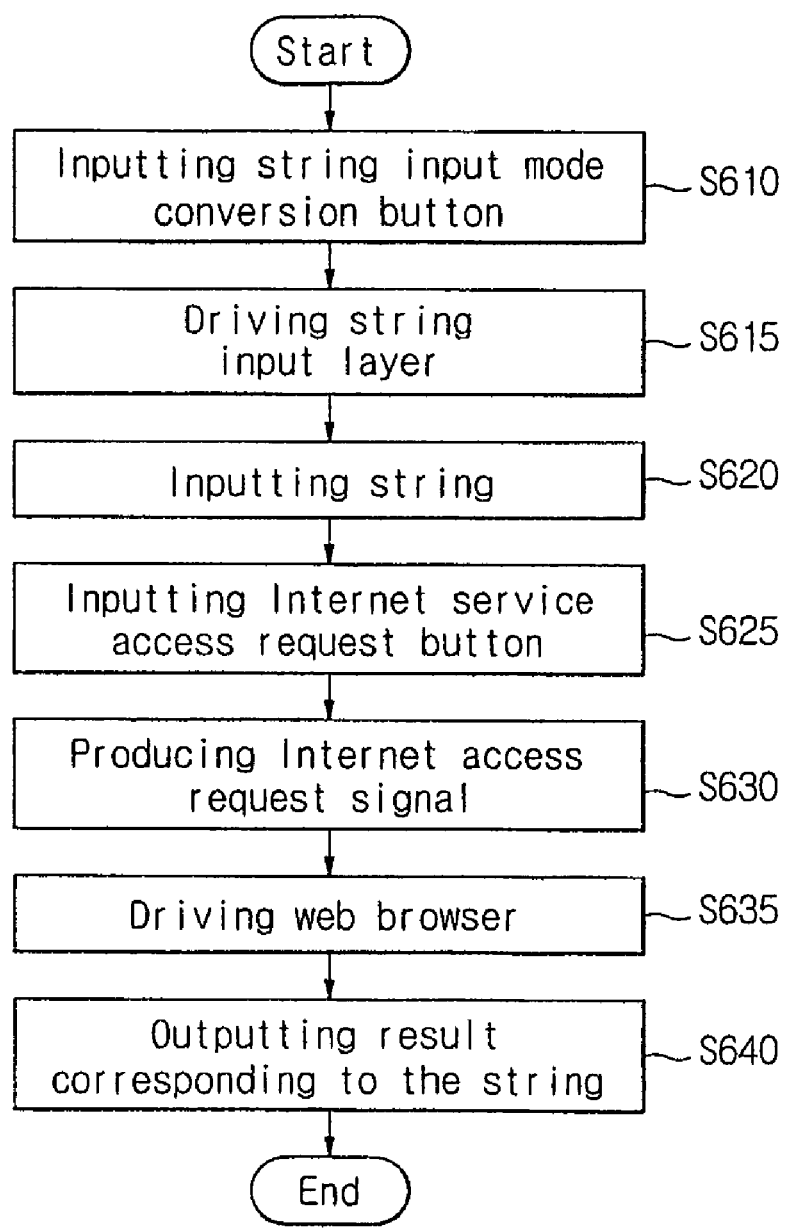
FIG. 7 illustrates an Internet service access process in the terminal according to one embodiment of the present invention.

Hereinafter, The method for accessing the Internet service access according to one embodiment of the present invention comprising the configuration is described. FIG. 6 illustrates an entire process for providing the Internet access service and FIG. 7 illustrates the operation of the terminal and the Internet access service server in detail.

FIG. 6 illustrates the Internet service access process by employing the string according to one embodiment of the present invention.

Referring to FIG. 6, the data transmitting/receiving process between the mobile terminal (200) and the proxy server to provide the service according to one embodiment of the present invention is described.

In step S500, the string is inputted into the mobile terminal and the predetermined button is operated. In step S505, the Internet access request signal including the string is transmitted to the proxy server. Here, the string may comprise domain, URL, general word, name and the like.

In step S510, the proxy server extracts the string from the Internet access request signal, in step S515, analyzes it by a predetermined method. If the string is a known domain name, in step S520, the proxy server requests the URL information to the known general DNS server, and if the string is corresponding to the predetermined access request signal, in step S525, the proxy server requests the URL information to the string DNS server to extract the URL information corresponding to the string, and if the string is corresponding to the predetermined search request signal, in step S530, the proxy server requests the URL information to the predetermined search server to extract the URL information corresponding to the string.

In step S535, the Internet service access server receives the URL information from the general DNS server or the string DNS server or the search server, and in step S540, transmits it to the mobile terminal. Here, if the Internet service access server transmits only the URL information, the mobile terminal requests to be connected to a wanted web server by employing the received URL information. If the mobile terminal receives a connection response signal from the web server, the connection between mobile terminal and web server is produced.

In one embodiment, the information transmitted to the mobile terminal may include the URL information basically and further include separate information corresponding to each access server. For example, if the URL information is extracted from the general DNS server or string DNS server, not only the URL information but also the web page information are provided, and if the URL information is extracted from the search server, the search list including the URL information is transmitted. So if the general DNS server or the string DNS server is used, the accessing the wanted web server may be allowed directly without any additional operation of the separate button, and if the search server is used, the accessing the wanted site may be allowed by selecting one item from the search list. As described above, according to one embodiment of the present invention, it is to directly access the web site including the wanted contents not the homepage of the web site.

FIG. 7 is a flow chart illustrating the process for accessing the Internet service from the terminal according to one embodiment of the present invention. Hereinafter, referring to FIG. 7, the process for accessing the Internet service according to one embodiment of the present invention is described in detail.

In step S610, if the string input mode conversion button of the mobile terminal is operated, the corresponding string input mode conversion signal is produced.

In step S615, the mobile terminal drives the string input layer program. If the string input mode conversion signal is produced, the string input layer program is executed. That is, through outputting the string input mode screen in the mobile terminal according to the string input mode conversion signal, the string input layer provides an interface for a user to input the string.

In step S620, the user inputs the string by employing the key pad of the mobile terminal converted into the string input mode. Here, the string includes search words as well known domain information and Korean domain information. For example, if being a Korean domain, the string may be the domain address of the Internet web server named in Korean as "daum", "KT", "KTF" and if being a search word, the string may be "hospital", "gas station", "Chinese restaurant", "theater" and the like. According to one embodiment of the present invention, the string may further comprise an identifier which determines whether the string is the search word or the access word.

In step S625, the user completes inputting the string and the predetermined Internet access request button is operated, In step S630, the Internet access request signal including the string is produced and the produced Internet access request signal is transmitted to the proxy server in the Internet service access server. And in step S635, the mobile terminal drives the web browser and prepares to receive the URL information from the proxy server. Here, as described above, the URL information may be received with being included in the web page information or search list information. The web browser outputs the web page or search list received from the mobile terminal.

In step S640, the mobile terminal outputs the result corresponding to the string. If the Internet service access request signal including the string is the access signal, the contents corresponding to the web site is outputted in the terminal. And if the Internet service access request signal comprising the string is the search signal, the search list corresponding to the string is outputted in the terminal.

For example, if the string is "KTF", the results coupled to the Internet web server "http://www.ktf.com" corresponding to the "KTF" is outputted. And if the string is "hospital", the information about hospitals located in a particular area corresponding to the location of the mobile terminal is outputted.

Figure 8:
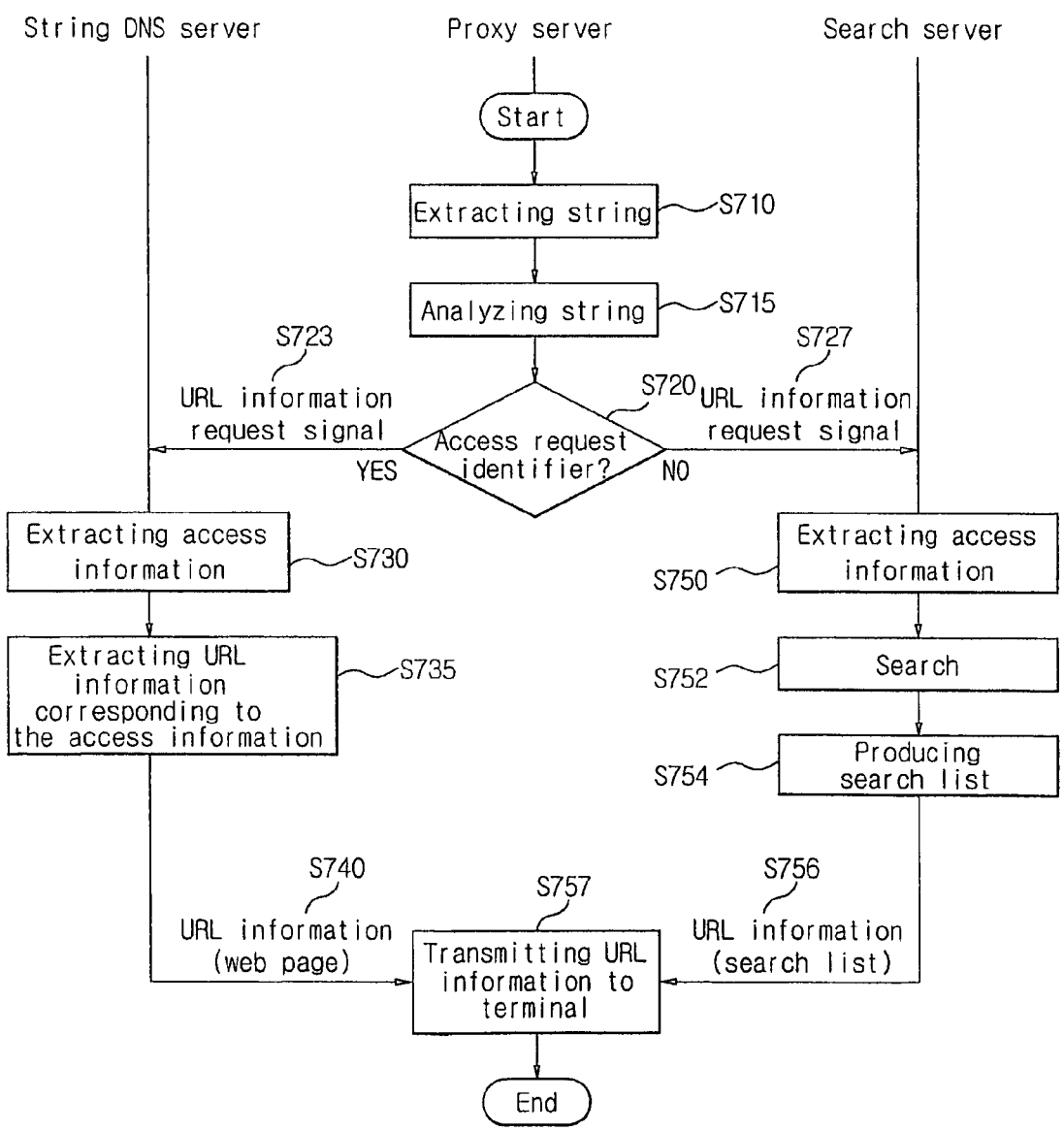
FIGS. 8 and 9 illustrate an Internet service access process in the Internet service access server according to one embodiment of the present invention.
Figure 9:
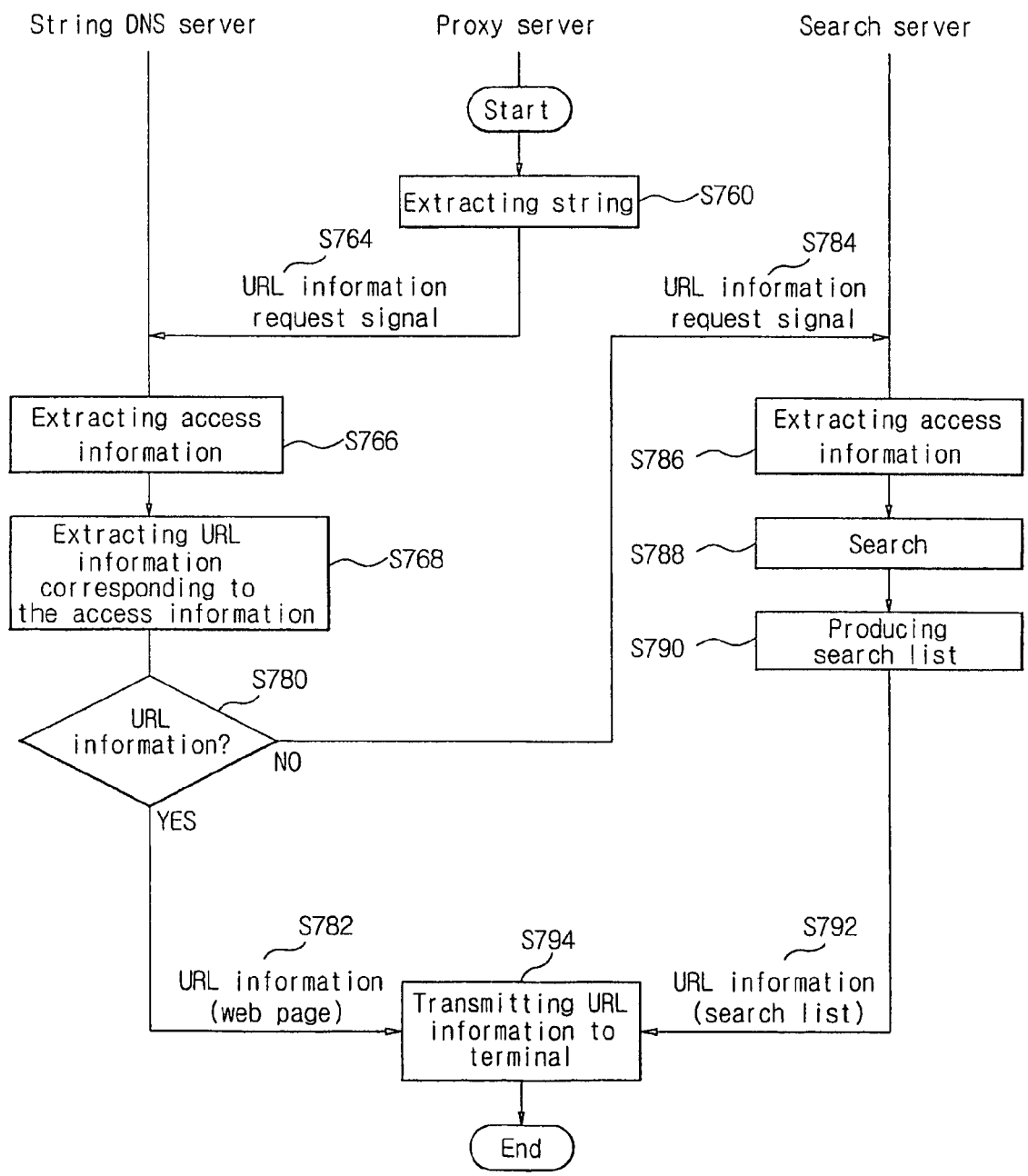

FIG. 8 and FIG. 9 are flow charts illustrating the process for accessing to the Internet service in the Internet service access server according to one embodiment of the present invention.

In one embodiment, the method by which the Internet service access server provides the web site information corresponding to the string can be divided into two types. One is an access service that accesses to the web site corresponding to the string, and the other is a search service that provides the web site list corresponding to the string by employing the key word corresponding to the string. By analyzing the string, one embodiment of the present invention provides the access service or the search service according to the predetermined method. Referring to the following table 3, the method by which the access service or the search service is identified with the string is described.

TABLE 3

| Category | Methods |
| --- | --- |
| use of identifiers | Extract the web site using identifiers |
| Search sequentially | First, search the web site corresponding to the string, if there is no web site, search is performed |

First, referring to FIG. 8, one embodiment of the present invention using the identifier is described.

In step S710, the proxy server in the Internet access service server receives the Internet service access request signal from the mobile terminal and extracts the string from the Internet service access request signal. In step S715, the proxy server analyzes the string according to the predetermined method and then in step S720, determines whether or not the string includes any access request identifier and determines whether the Internet service access request signal is the access request signal or the search request signal.

According to the determined result, if there is an identifier, it proceeds to step S723, in which the URL information request signal including the access information is transmitted to the string DNS server. If there is no such identifier, it proceeds to step S727, in which the URL information request signal comprising the search information is transmitted to the search server. In step S730, the string DNS server extracts the access information and in step S735, extracts the URL information corresponding to the access information from the address registering part. And the URL information or the web page including the URL information is transmitted to the proxy server.

And there is no such identifier, in step S750, the search information is extracted from the URL information, the search is performed by employing the search word or the operator which is included in the search information. And in step S754, the search list including the URL information is produced by employing the search result. And in step S756, the search list including the URL information is transmitted to the terminal. Here, if the search result is selected, the URL information corresponding to the search result is extracted and it is allowed to directly access to the web page corresponding to the detailed information.

Next, referring to FIG. 9, one embodiment of the present invention using the identifier is described.

In step S760, the proxy server in the Internet access service server receives the Internet service access request signal from the mobile terminal and extracts the string from the Internet service access request signal. And in step S764, the proxy server transmits the URL information request signal including the string (access information) to the string DNS server. In step S766, the string DNS server extracts the string information and, in step S768, extracts the URL information corresponding to the string from the address registering part. And in step S780, if there is the URL information corresponding to the string, in step S782, the URL information or the web page including the URL information is transmitted to the proxy server.

And in step S780, there is no such URL information corresponding to the string, in step S784, the URL information request signal including the string (search information) is transmitted to the search server. In step S786, the search server extracts the search information form the URL information and, in step S788, the search is performed by employing the search word or the operator which is included in the search information. And in step S790, the search list including the URL information is produced by employing the search result. And in step S794, the search list including the URL information is transmitted to the terminal.

Figure 10:
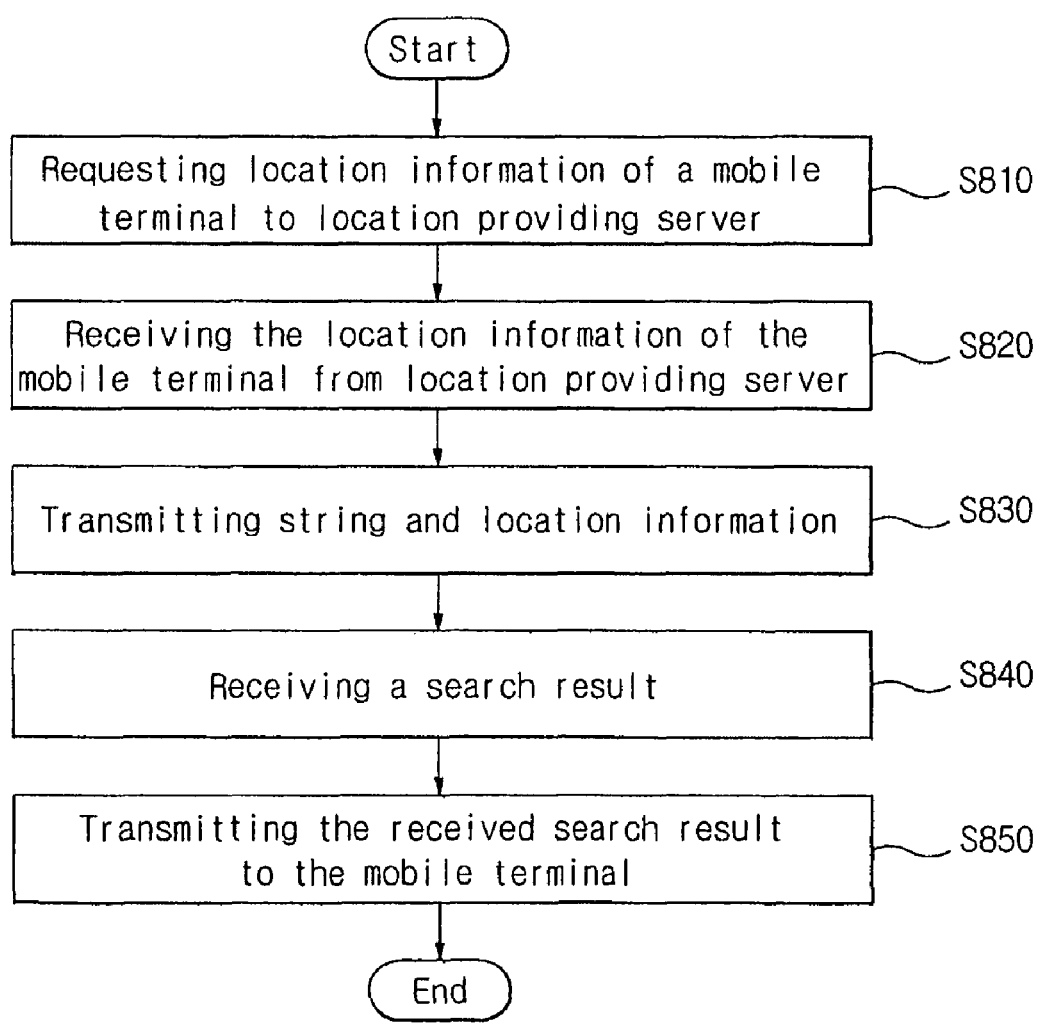
FIG. 10 illustrates a process for providing a location base service according to one embodiment of the present invention.

FIG. 10 is a flow chart illustrating the process for providing the location based service according to one embodiment of the present invention.

The search service may be provided efficiently by employing the predetermined search field and search word. Especially, if the search field is location information, only the URL information extracted corresponding to the location information may be provided. Also, even if such location information is not inputted, the location information is extracted by employing the location method according to one embodiment of the present invention, and the proxy server may provide the access information to the string DNS server or search server according to the location information. Hereinafter, referring to FIG. 10, the process is described.

In step S810, the Internet access service server requests the location information of the mobile terminal to the location providing server to obtain the location information of the mobile terminal which is to be added to the URL information request signal. In step S820, the Internet access service server receives the location information of the mobile terminal from the location providing server. Here, the location providing server is coupled to the MSC and the like and stores the location of the mobile terminal. For example, the location providing server may be a HLR (Home Location Register), VLR (Visitor Location Register). Such location providing server stores the BTS identifier transmitted from the mobile terminal as the location of the mobile terminal and transmits the location information of the mobile terminal according to the request of the Internet access service server. And it is obvious that the location information can be extracted by employing the conventional positioning methods, for example, GPS, power measurement.

In step S830, the proxy server transmits the URL information request signal including the access information and the location information of the mobile terminal to the string DNS server or the search server and the string DNS server or the search server extracts the URL information corresponding to the access information and the location information.

In step S840, the proxy server receives the search result corresponding to the string and the location information from the string DNS server or the search server and in step S850, transmits it to the mobile terminal. Such server that performs the function of LBS (Location Base Services) is obvious to those skilled in the art, therefore, further description will not be made.

The string able to be inputted according to one embodiment of the present invention is not limited and the web site corresponding to the predetermined string is exacted. The DNS server comprises a code analysis server and may further comprise an address registering server. The string DNS server (420) receives Korean domain address of the web server inputted as the string and the like and outputs the domain address corresponding to it. For example, if the string "KTF" is inputted to the string DNS server (420), a domain address "http://www.ktfcom" of the web server is outputted. Here, if the user operates the string input mode conversion button of the mobile terminal (200) and the mobile terminal (200) is converted to the string input mode, the user inputs the wanted string.

Figure 11:
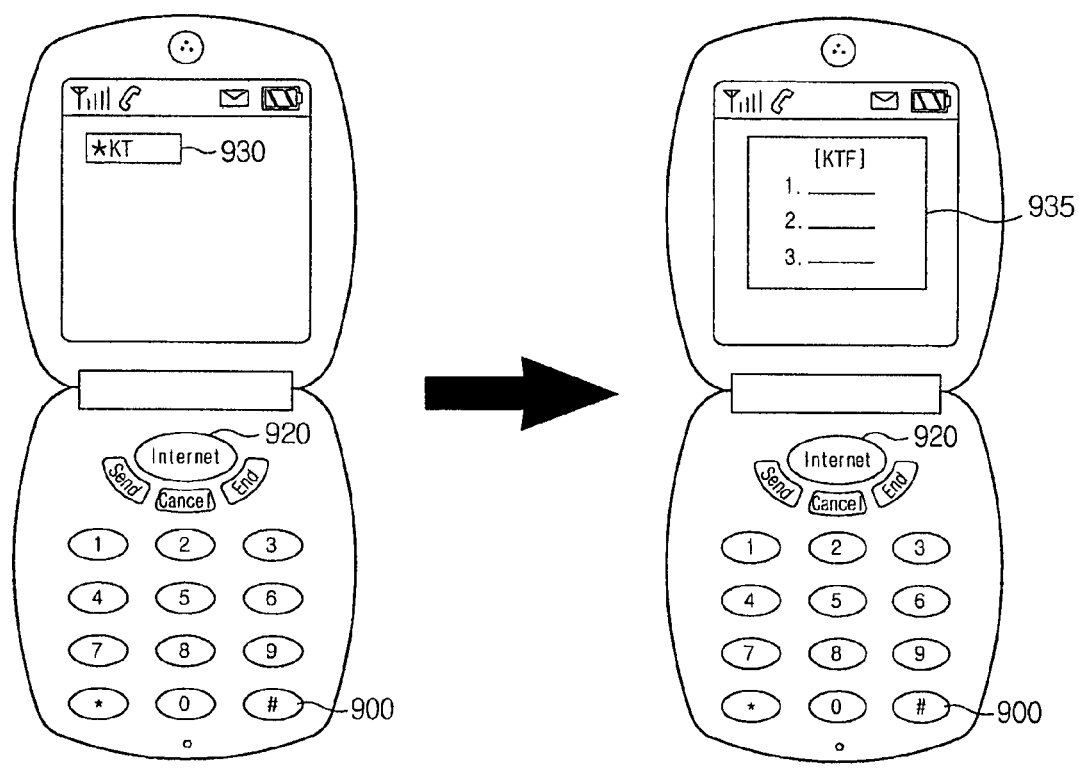
FIGS. 11 to 13 illustrate a user interface screen according to one embodiment of the present invention.
Figure 12:
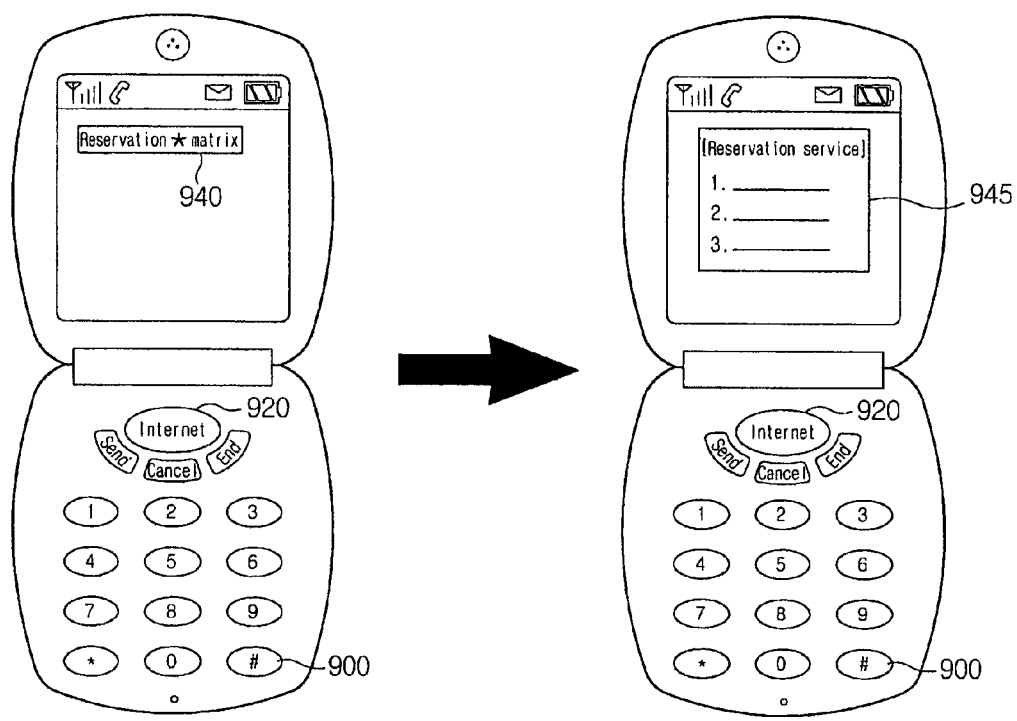
Figure 13:
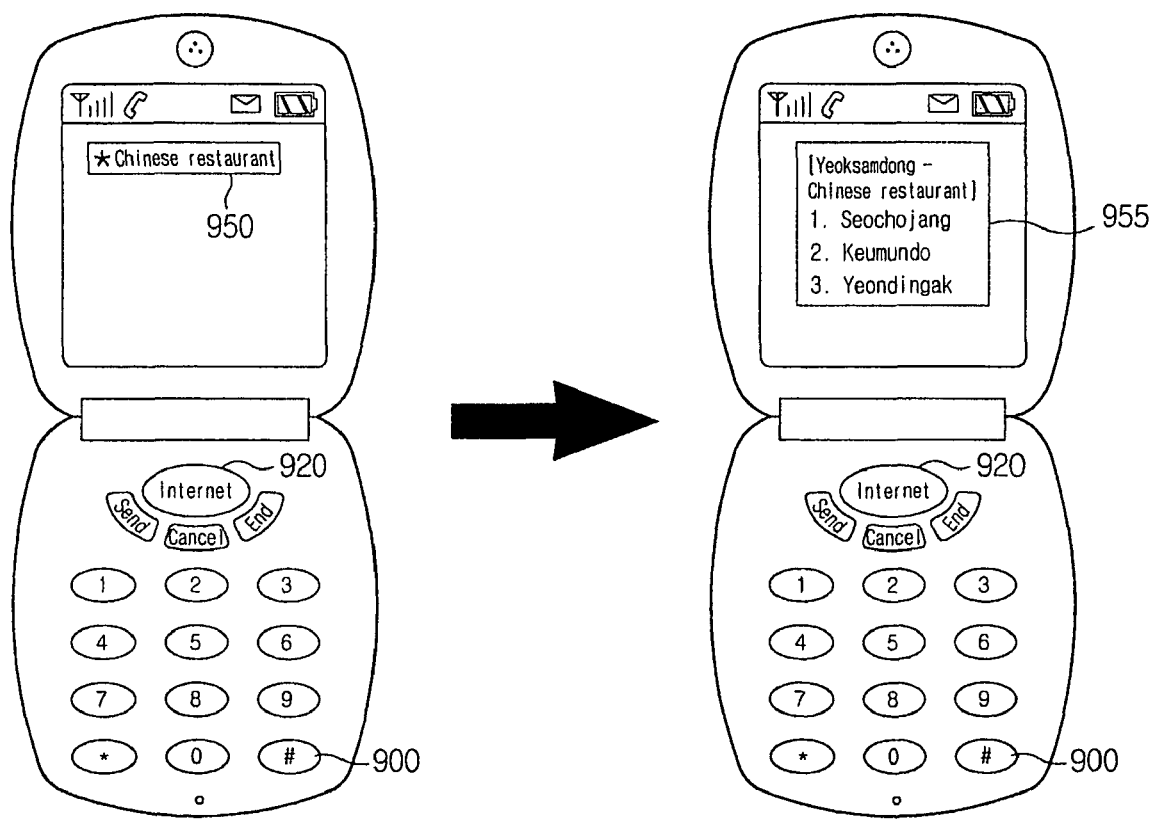

FIGS. 11 to 13 illustrate the user interface screen according to one embodiment of the present invention. FIG. 11 shows a case where the access information is inputted, FIG. 12 shows a case where the search information comprising the operator is inputted, and FIG. 13 shows a case where only the search information is inputted.

Referring to FIG. 11, the mobile terminal provides various buttons, especially, comprises an Internet service request button (920) and a string input mode conversion button (900). Here, the string input mode conversion button may be a separate function button that performs the string input mode conversion according to one operation or a "*" button or a "#" button that performs the string input mode conversion by clicking during predetermined time.

If the user operates the string input mode conversion button (900) to input the string, the mobile terminal is converted to the string input mode preparing the input. If the user inputs the string 'daum' in the string input mode of the mobile terminal and operates the Internet service request button (920), the mobile terminal outputs the corresponding web page screen (935).

The process that the result screen (935) is outputted corresponding to the button operation and the string input of the user is described in detail. The mobile terminal (909) transmits the inputted string to the proxy server according to the operation of the Internet service request button (920). The proxy server requests a search to the string DNS server with the received string. The string DNS server extracts the URL information corresponding to the string "daum"(940) and requests to be connected with the web server using the URL information and outputs the result screen (949) in mobile terminal if a response for the request and the connection is setup.

Referring to FIG. 12, the mobile terminal comprises the Internet service request button (920) and the string input mode conversion button (900) like FIG. 11.

If the user inputs a string (940) including search field, operator and search word, the string is recognized as the search information and transmitted to the search server. The search server identifies the search information by employing the operator and extracts the URL information of detailed web page information provided for making a reservation of the matrix by employing the search field and the search word and provides the web page information corresponding to the URL information.

Referring to FIG. 13, the mobile terminal comprises the Internet service request button (920) and the string input mode conversion button (900) like FIG. 11.

Here, if the user inputs the string "Chinese restaurant", the search corresponding to it is performed. If the user inputs "Chinese restaurant" (950) in the string input mode of the mobile terminal and operates the Internet service request button (920), the result screen (999) is outputted in the mobile terminal (909).

The process that the result screen (999) is outputted corresponding to the button operation and the string input of the user is described in detail. The mobile terminal (909) transmits the inputted string to the Internet access service server according to the operation of the Internet service request button (920).

The proxy server of the Internet access service server transmits the received string to the search server. The search server recognizes such string as the search word and searches a domain address corresponding to the "Chinese restaurant" (950). Because such search function may be based on the location, the location providing server may provide the location information of the mobile terminal together. Here, if the location information is "yoksam 1 dong", the Internet access service server performs the search with "yoksam 1 dong" and "Chinese restaurant" and transmits the search result to the Internet access service server.

A Second Embodiment

Figure 14:
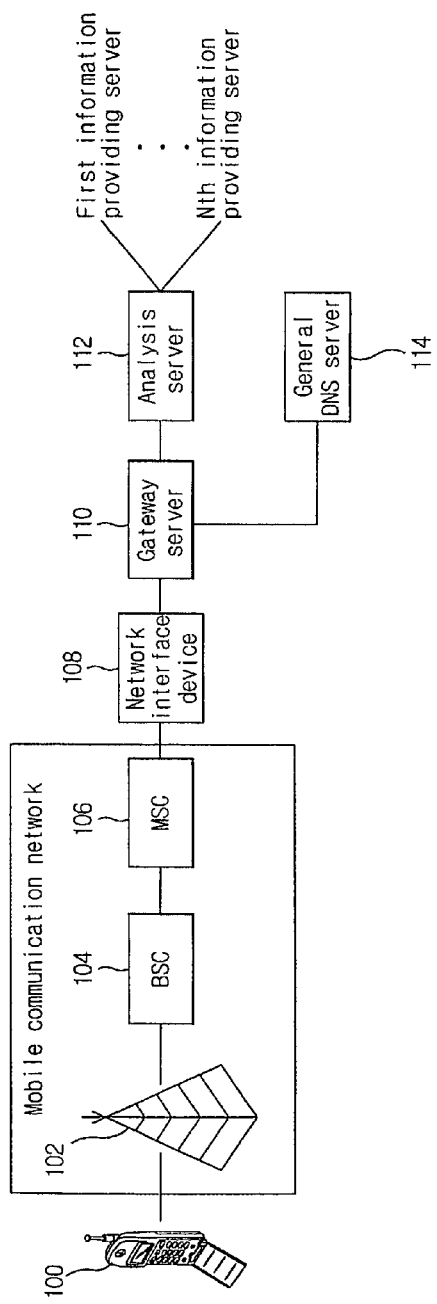
FIG. 14 illustrates a wireless Internet access system with string and function key according to another embodiment of the present invention.

FIG. 14 illustrates the configuration of the wireless Internet access system with a string and a function key according to another embodiment of the present invention. The wireless Internet access system may comprise a mobile terminal (100), a BTS (102) provided for mobile communication network, a BSC (104), a mobile communication MSC (106), a network matching apparatus (108), a gateway server (110) and an analysis server (112). The mobile terminal (100) comprises a wireless web browser (not shown) to display the information provided from one or more information providing servers (one or more information providing servers out of the first to Nth information providing server) to the user after accessing the wireless Internet. The terminal (100) also comprises various keys (buttons) that include several predetermined wireless Internet access keys (referring to 220a of FIG. 15) and Korean mode conversion key (referring to 210a of FIG. 15) to execute the wireless Internet access method according to one embodiment of the present invention. The predetermined wireless Internet access key is the function key provided for the terminal for the user to determine whether or not it is the wanted information or service. Such function keys for the wireless Internet access (hereinafter, also referred to as "function key") may comprise a new function key that has not been before in the conventional terminal, that is, exclusive key or may add new or additional function to the key that has been before.

Figure 15:
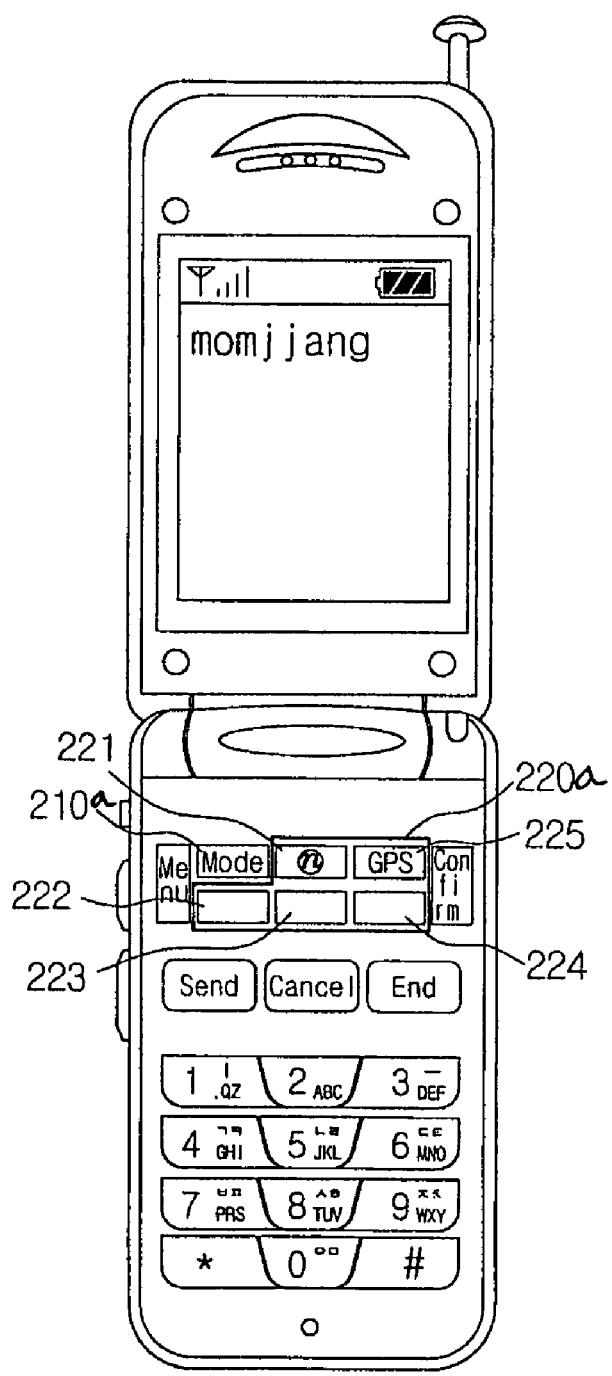
FIG. 15 illustrates the mobile terminal shown in FIG. 14.

The function keys (220a) shown in FIG. 15 is the exclusive function keys for the wireless Internet access. The function key for the wireless Internet access may be the keys like "*" or "#" determined to operate as the wireless Internet access function key when it is pushed continuously during a predetermined time or several times.

The mobile terminal (100) is also provided with a Korean mode conversion key (210a). The Korean mode conversion key (210a) may be a separate function button which performs the conversion to the string input mode according to the one operation or a key set to perform the conversion to the string input mode when pushed continuously during a predetermined time.

If the user operates the Korean mode conversion key (210a) to input the string, the mobile terminal (100) recognizes it and is converted to the string input mode for string input.

If the string is inputted and one function key out of plural function keys is operated, the terminal (100) produces a transmission code according to the predetermined rule and drives a wireless web browser. The transmission code comprises a predetermined service distinguisher for identifying the wireless Internet access service and a string inputted by the user and a function key identifier corresponding to the function key inputted by the user. The terminal (100) transmits a wireless Internet access service request signal to the gateway server (110) through the mobile communication network by employing the transmission code.

Figures 16, 17:
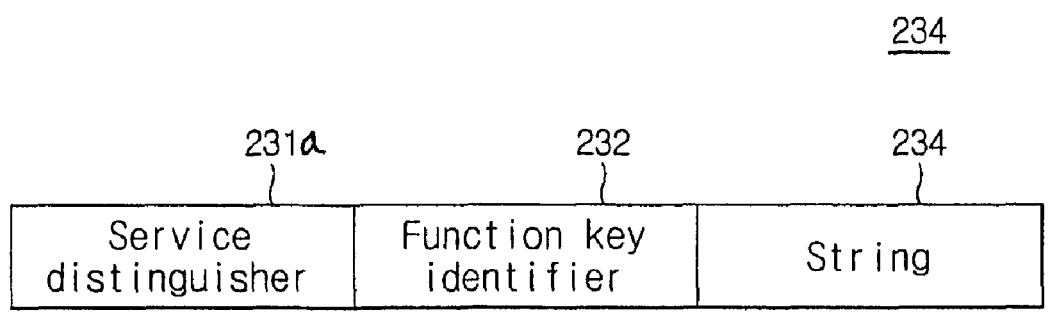
FIG. 16 illustrates a configuration of a transmission code produced in the terminal for wireless Internet access service according to one embodiment of the present invention.
FIG. 17 illustrates a example of the transmission code.

The general function of the terminal is obvious to those skilled in the art, therefore, further description about it will not be made. Referring to FIGS. 15 to 17, the function of the terminal according to one embodiment of the present invention is further described as follows.

If the user pushes the Korean mode conversion key (210a) in the terminal waiting display state and inputs the string that may comprise Korean, English, special symbols and the like and pushes one function key out of a plurality of function keys (220a), the terminal drives the wireless web browser and produces the transmission code according to the predetermined rule and tries the wireless Internet access. Here, the string comprises any form of information inputted by the user so long as it can be inputted in the terminal (100). As shown in FIG. 16, the transmission code for the wireless Internet access produced in the terminal (100) comprises a service distinguisher (231), a function key identifier (232) and the string (234) inputted by the user. As shown in FIG. 17, for example, the service distinguisher (231) may be "#" or, of course, other special symbols, numerals and the like. The function key identifier identifies the function key pushed by the user out of a plurality of wireless Internet access function keys (210a) and each function key has an unique identifier.

So, if the user inputs a specific string (for example, momjjang) and pushes any function key (221), as shown in FIG. 17, the terminal produces the transmission code which is used as the access URL on driving the wireless Internet browser by adding "http://# 1" in front of the specific string (momjjang) inputted by the user. Here, "#" is a service distinguisher by which the gateway server (110) identifies the service according to one embodiment of the present invention. "1" is a function key identifier. It is obvious that the service distinguisher may be other codes than "#". And the function key identifier may be the numeral and determines which function key is selected in the following analysis code.

FIG. 18 illustrates the numeral corresponding to the each function key when the function key identifier is the numeral. Referring to FIG. 18, the identifier of 'magicn' key, 'k-merce' key, 'multi pack' key, 'fimm' key, 'gps' key of the function keys is corresponding to the numerals 1, 2, 3, 4, 5, respectively. And the numerals 0, 6 to 9 are not used. The identifier corresponding to the function key may be character, special symbol or others that can be inputted in the terminal.

The information inputted by the user on using the service may be outputted on the terminal screen.

Until the user receives the result through the wireless Internet after pushing the terminal function key, multimedia function (data), for example, image, sound, may be provided according to the function key inputted by the user. The mobile terminal on which a perfume producing device is mounted may provide different smell according to the terminal function key. The result information provided to the user may be multimedia function (data), for example, image, sound and the like as a background according to the terminal function key. The mobile terminal on which a perfume producing device is mounted may provide different smell according to the terminal function key.

For example, if the user inputs the string "momjjang" in the terminal waiting display state and pushes the terminal function key "magicn"(n)key(n)key) (221), the terminal drives the wireless Internet browser and produces the transmission code of "http://#1momjjang" and further tries the wireless Internet service access by employing the transmission code as URL. At this time, "searching, wait a minute", or "to be connected to the momjjang" may be displayed in the terminal display. Also at this time, the multimedia, for example, an image and/or a sound may be displayed as the background corresponding to the terminal function key "magicn"(n)key(n)key)(221) set by the user in the terminal.

According to another embodiment of the present invention, if the user inputs the string "Gangnam station" in the terminal waiting display state and pushes the GPS key ('gps' key) (225), the terminal drives the wireless Internet browser and produces the transmission code of "http://#1 Gangnam station" and tries the wireless Internet service access by employing the transmission code as URL. At this time, "searching, wait a minute" or "to be connected to the Gangnam station" may be displayed in the terminal display. Also at this time, the multimedia, for example, an image and/or a sound may be displayed as the background corresponding to the terminal function key GPS key ('gps' key) (225) set by the user in the terminal. Again referring to FIG. 14, the BTS (102) transmits the wireless Internet access request message received from the terminal (100) to the BSC (104) and the BSC (104) transmits it further to the mobile communication MSC (106).

The mobile communication MSC (106) provides the function that matches the mobile communication network with the fixed network such as PSTN and ISDN, or with the network of another company such as PLMN, Internet network and PSPDN, or with another communication network. In this embodiment, the mobile communication MSC (106) analyzes the data packet of the received wireless Internet access request signal and recognizes that it is the message to be transmitted to the wireless Internet network and transmits it to the network matching apparatus (108) Also, the BSC (104) may perform the above analysis and transmit the message to the network matching apparatus (108) according to the configuration of the network.

The network matching apparatus (108) is located between the wireless communication network and the Internet network, and matches a mobile communication protocol with a Internet protocol.

The gateway server (110) performs the function of the general proxy server as the system for connecting the mobile terminal with the wireless Internet contents. The proxy server may perform the proxy function in the general Internet and wireless Internet. The gateway server (110) may recognize by determining whether or not the service distinguisher (231) is included in the string received from the terminal (100) in addition to the function of the general proxy server. If the service distinguisher (231) is included in the string and so the service request is recognized, the information is transmitted to the analysis server (112) for handling the corresponding string (including the function key identifier). Of course, the gateway server (110) may directly perform the function of the analysis server (112).

Also, if the gateway server (110) analyzes the URL received from the terminal (100) and the URL follows the general Internet address system like an URL (uniform resource locator), a domain name or an IP address without the service distinguisher (231), the gateway server (10) may get the real URL information by referring to the general DNS server (114) and transmit it to the terminal or may request the information from the site corresponding to the real URL information and transmit it to the terminal The analysis server (112) analyzes the string received from the gateway server (110), extracts the string and the function key identifier inputted by the user, and organizes the information corresponding to request and transmits it to the user. Here, the analysis server (112) may organize the necessary information with being corresponding to the information providing servers or may only transmit the address corresponding to the information of the information providing server.

The information providing server responds the request of the analysis server (112), extracts the corresponding information or a detailed address corresponding to the information, and provides it to the analysis server (112). There may be a plurality of information providing servers. Preferably, the information providing server may be corresponding to each function key.

FIG. 19 is a table illustrating the information providing server corresponding to each function key and the type of the information provided by each information providing server. The corresponding function key may be defined additionally according to the terminal. Referring to FIG. 19, 'magicn' key (function key identifier:1) is corresponding to a magicn united search server and a portal knowledge search server. The magicn united search server performs the united search function corresponding to the inputted string and the portal knowledge search server provides the function like the knowledge search service of the wire Internet, that is, searches the knowledge information corresponding to the inputted string and provides it. The magicn key is a function key for accessing the wireless Internet in terminal.

A 'k-merce' key (function key identifier:2) is corresponding to a k-merce server. The k-merce server is an information providing server for providing the information like shopping, stock, banking, lottery. The k-merce key is a function key for accessing the M-Commerce service in the terminal.

A multipack key (function key identifier:3) is corresponding to a multipack application server. The multipack application server provides a multipack application list and an address corresponding to it, so the user may download the wanted application. The multipack key is a function key for downloading or driving a VM (Virtual Machine) application.

A 'fimm' key (function key identifier:4) is corresponding to a fimm server. The fimm server is a server for providing the VOD (Video On Demand)/AOD (Audio On Demand) contents. The fimm key is a function key for accessing a VOD/AOD service.

A 'gps' key (function key identifier:5) is corresponding to a location base service server. The location base service server is a server for providing the location or the geographic information related to a certain string. The gps key is a function key for accessing the service related to the location.

After receiving the wireless Internet service access request signal from the gateway server (110), the analysis server (112) may request the information to the information providing server corresponding to the function key out of a plurality of information providing server. For example, if the user inputs the string as "the lord of the rings" and clicks the 'fimm' key, a transmission code as "http://#4the lord of the rings" is produced in the terminal and transmitted to the gateway server (110). The gateway server (110) recognizes the service distinguisher (#) from the received transmission code (http://#4the lord of the rings) and transmits the corresponding information to the analysis server (112). Then the analysis server (112) requests the information corresponding to "the lord of the rings" or the address information indicating the corresponding information to the information providing server corresponding to the 'fimm' key, that is, fimm server. That is, the analysis server (112) requests that the fimm server searches the information corresponding to "the lord of the rings" and provides it. The fimm server searches the information corresponding to "the lord of the rings" and provides it to the analysis server (112). The information corresponding to "the lord of the rings" provided by the fimm server may be the moving pictures of "the lord of the rings" or the audio information as a sound track.

On the other hand, after receiving the wireless Internet service access request signal from the gateway server (110), the analysis server (112) may request the information to all information providing servers coupled with it. If receiving the corresponding information from a plurality of information providing servers, the analysis server (112) may arrange with a priority for the received information according to the function key. That is, the analysis server (112) may reorganize the information received from a plurality of information providing servers according to the priority corresponding to the clicked function key (that is, a function key identifier) and make it displayed in the terminal of the user according to the priority. As described above, if the user inputs the string as "the lord of the rings" and clicks the 'fimm' key, a transmission code as "http://#4the lord of the rings" is produced in the terminal and transmitted to the gateway server (110). The gateway server (110) recognizes the service distinguisher (#) from the received transmission code (http://#4the lord of the rings) and transmits the corresponding information to the analysis server (112). Then the analysis server (112) requests the information corresponding to "the lord of the rings" or the address information indicating the corresponding information to a plurality of or all information providing servers coupled with the analysis server (112). That is, the analysis server (112) requests that all information providing servers coupled with the analysis server (112) searches the information corresponding to "the lord of the rings" and provides it. In responding to it, each information providing server searches the information corresponding to "the lord of the rings" and provides it to the analysis server (112). Then the analysis server (112) may reorganize the information received from each information providing server according to the priority corresponding to the clicked function key (that is, function key identifier) and make it displayed in the terminal of the user according to the priority. Here, the top 5 (for example, 5) information corresponding to the upper priority may be displayed preferentially and the other information may be included in directory shape. For example, the top 5 information corresponding to the upper priority out of the information received from the information providing server corresponding to the function key (fimm key) may be displayed preferentially and the information received from the other information providing server may be provided with being included in the each directory of the related service to the terminal.

It is preferable that the analysis server (112) shows the number of the information included in the directory.

Also, if the information preferentially corresponding to the function key is not received in the predetermined time, each directory of the related service may be organized preferentially and provided to the terminal.

The information provided from each information providing server to the analysis server (112) may be the detailed information corresponding to the information requested by the analysis server (112) or the page of the corresponding detailed address (URL). So, the analysis server (112) may transmit the detailed address (URL) information corresponding to the information to the terminal and the terminal may access the corresponding address (URL) again, or the analysis server (112) may transmit the corresponding detailed information page to the terminal.

Figure 20:
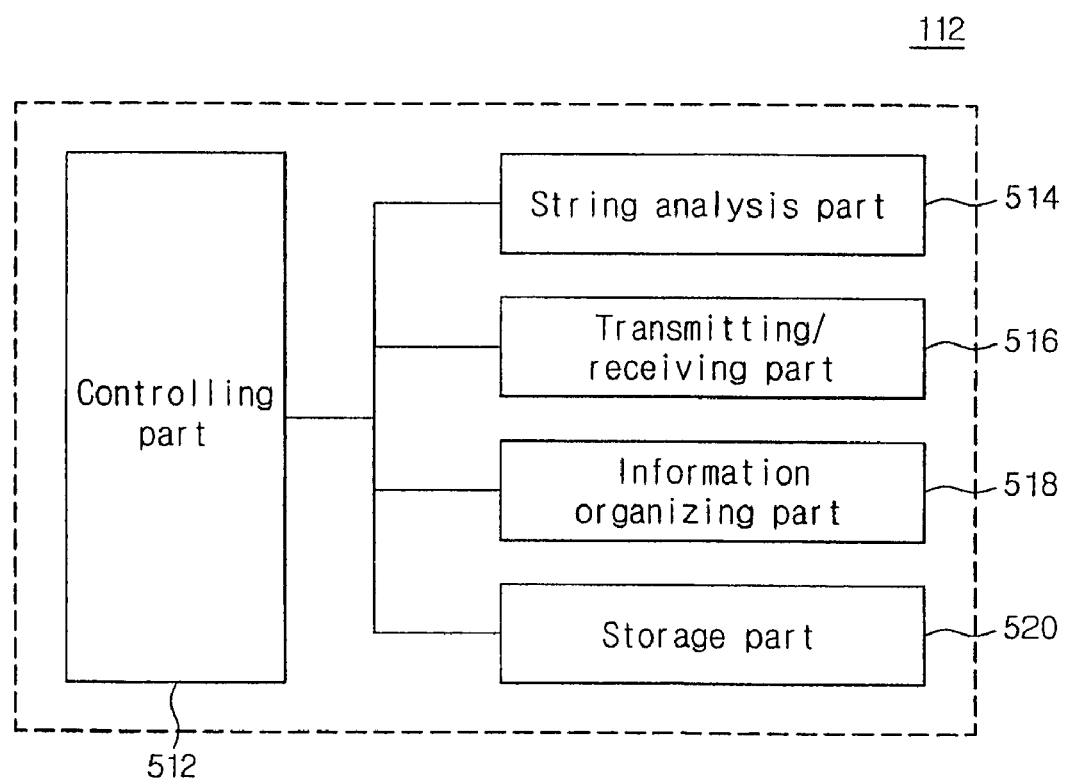
FIG. 20 illustrates an analysis server for providing a wireless Internet service access method with string and function key according to one embodiment of the present invention.

FIG. 20 illustrates the analysis server (112) for providing the wireless Internet service access method with the string and the function key according to one embodiment of the present invention.

Referring to FIG. 20, in one embodiment, the analysis server (112) comprises a controlling part (512), a string analysis part (514), a transmitting/receiving part (516), an information organizing part (518) and a storage part (520). The controlling part (512) controls the entire operation of the analysis server (112). The transmitting/receiving part (516) receives the string (comprising the function key identifier) for accessing the wireless Internet service from the gateway server (110). The received string is analyzed by the string analysis part (514). The transmitting/receiving part (516)

transmits the information request signal about the received string to the information providing server and receives the information from the information providing server.

The information received from the information providing server is reorganized by the information organizing part (518) according to the priority.

The reorganized information by the information organizing part (518) is transmitted to the gateway server (110) through the transmitting/receiving part (516) and provided to the terminal.

The storage part (520) is a memory or a database provided in analysis server (112) for storing the information frequently requested by the user. The analysis server (112) stores the information frequently requested by the user in the storage part (520) therein, and if there is a request for the corresponding information, then not employing the information providing server, the analysis server (112) may extract the information from the storage part (520) and reorganize it if necessary and transmit it to the terminal. Such function is one of the function of the general proxy server and the analysis server (112) may perform such function of the general proxy server.

Figure 21:
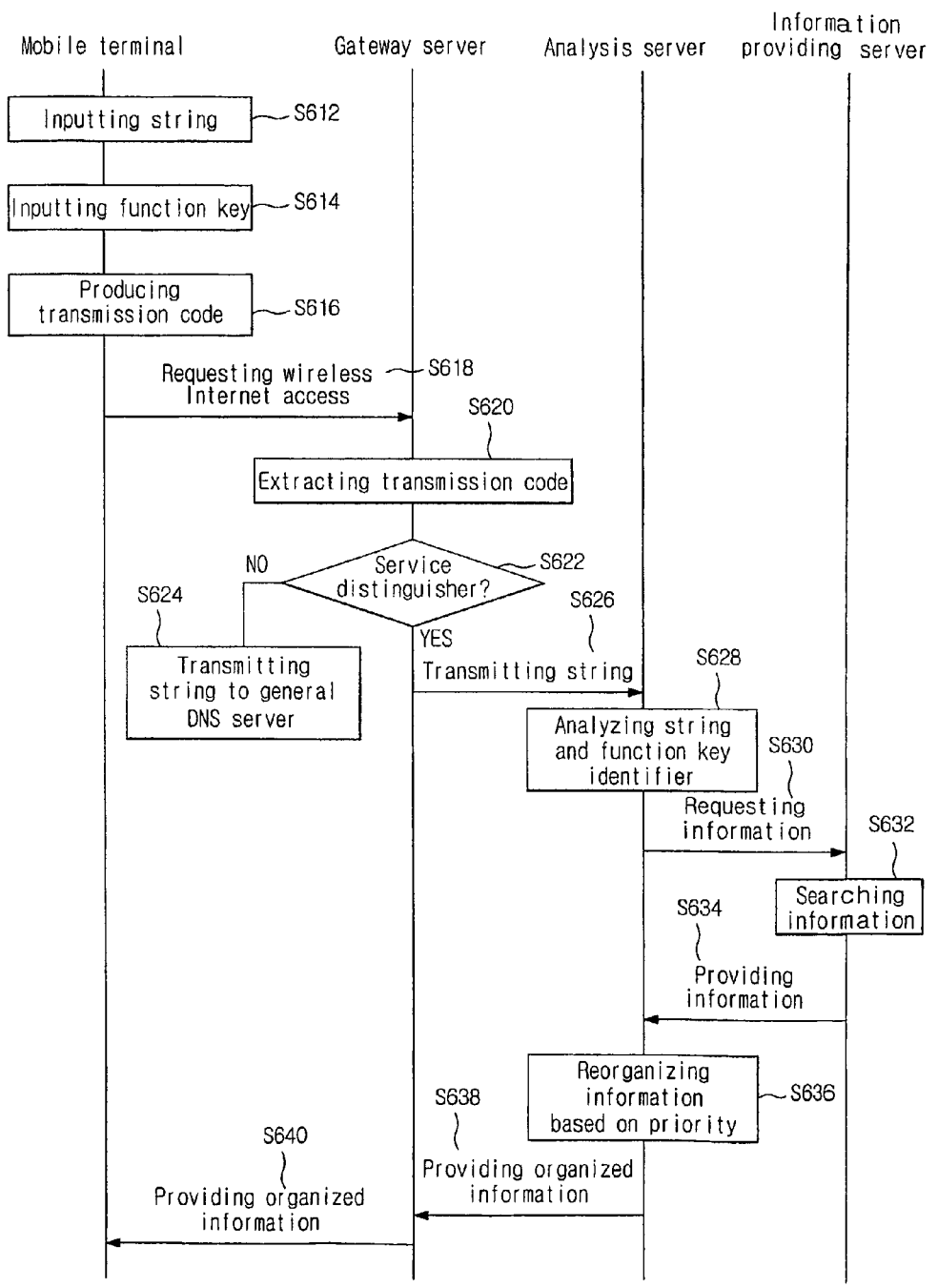
FIG. 21 illustrates a wireless Internet service access process with string and function key according to one embodiment of the present invention.

FIG. 21 illustrates the wireless Internet service access process with the string and the function key according to one embodiment of the present invention.

The string is inputted in the terminal by the user to request to access to the wireless Internet service (S612). To input the string, the user may click the Korean (or English) mode conversion key first. Any function key out of a plurality of wireless Internet access function keys is clicked (S614).

Then, the transmission code for requesting the wireless Internet service access is produced in the terminal (S616). As described in FIG. 14, the configuration may be "http://#+a number of the corresponding function key+string". Here, the string may comprise a domain, an URL, a general word, and a name. The terminal transmits the wireless Internet access request signal to the gateway server (110) by employing the produced transmission code (S618). The gateway server (100) extracts the transmission code from the wireless Internet access request signal (S620) and determines whether or not the transmission code comprises the service distinguisher for distinguishing the wireless Internet access service according to one embodiment of the present invention (S622). According to the determination result of step S622, if the transmission code includes the predetermined service distinguisher (for example, #) for distinguishing the wireless Internet access service, the gateway server (110) transmits the extracted string to the analysis server. The transmitted string comprises the string and the function key identifier (that is, a numeral corresponding to the function key) inputted by the user in terminal. So the string following the service distinguisher (#) may be transmitted to the analysis server.

According to the determination result of step S622, if the transmission code does not include the predetermined service distinguisher (for example, #) for distinguishing the wireless Internet access service according to one embodiment of the present invention, in case the string is a general domain name, the gateway server (110) transmits the string to the general DNS (Domain Name Server) and requests the information. Referring to FIG. 21, if the transmission code does not include the predetermined service distinguisher (#) for distinguishing the wireless Internet access service according to one embodiment of the present invention, the gateway server (110) requests the information to the general DNS (Domain Name Server). Also the gateway server (110) may request the information for other specific service to a certain server.

If the string is transmitted to the analysis server (S626), the analysis server analyzes the string and the function key identifier (the numeral corresponding to the function key) and determines which information providing server is requested for providing the information. If the analysis server has the function of the general proxy server, the storage part in the analysis server may extract the corresponding information.

The analysis server requests the information to the determined information providing server (S630). Here, the determined information providing server may be all information providing servers coupled with the analysis server or the information providing server preferentially related to the corresponding function key. The information providing server receiving the information request searches the information corresponding to the string (S632) and provides it to the analysis server (S634). The analysis server reorganizes the information received from the information providing server according to the priority (S638) and transmits the reorganized information to the gateway server (S638). The gateway server transmits the information to the terminal (S640).

According to one embodiment of the present invention, though the string inputted by the user is the same, other information may be provided according to the wireless Internet access function key inputted by the user.

For example, though the same string as "Gangnam station" is inputted, if the inputted wireless Internet access function key is the magicn key, then the news or the knowledge information about the "Gangnam station" may be provided preferentially, or if the inputted wireless Internet access function key is the k-merce key, then the information of the bank or shopping near "Gangnam station" may be provided preferentially, or if the inputted wireless Internet access function key is the fimm key, then the moving pictures or audio signal about "Gangnam station" may be provided preferentially. So, it is more likely that the user is provided preferentially with the wanted information.

Figure 22:
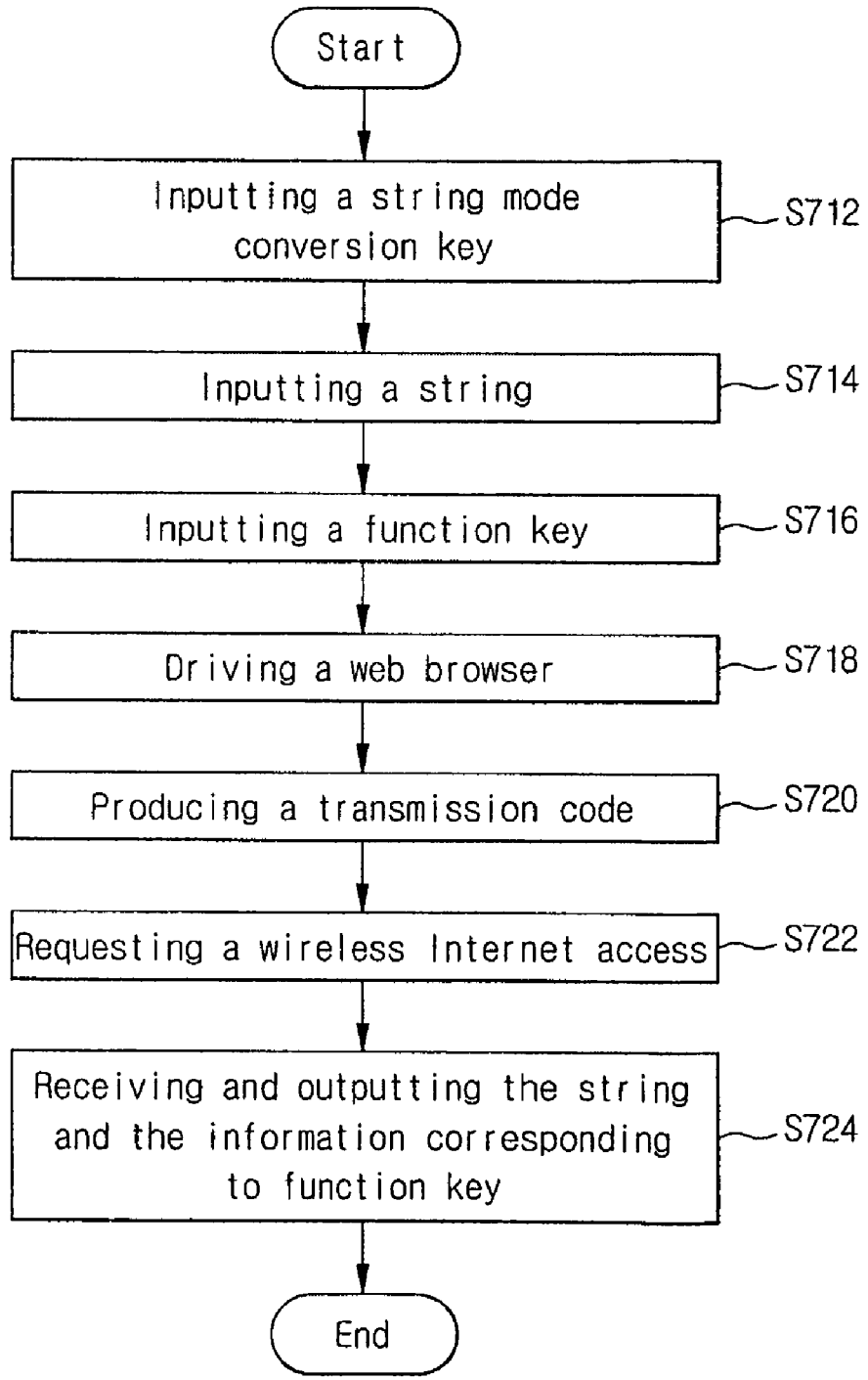
FIG. 22 illustrates a wireless Internet service access process in the terminal according to one embodiment of the present invention.

FIG. 22 illustrates the wireless Internet service access process in terminal according to one embodiment of the present invention.

Referring to FIG. 22, if the Korean mode conversion key is operated in mobile terminal, the corresponding Korean mode conversion signal is produced and the terminal is converted into the string input mode for inputting Korean/English/special symbol (S712). If converted into the string input mode, the terminal may provide the user with interface for inputting the string by outputting the string input mode screen.

The user inputs the string by employing the key pad of the terminal converted into the string input mode (S714). After inputting the string, if any key out of a plurality of Internet access function keys is inputted by the user (S716), the wireless web browser is driven (S718). Also, the transmission code for requesting the wireless Internet service access is produced according to the string and function key inputted by the user (S720). The transmission code comprises the service distinguisher, the function key identifier for identifying function key inputted by the user and the string inputted by the user.

The terminal transmits the wireless Internet service access request signal by employing the produced transmission code (S722), and the terminal receives the information corresponding to the string and the function key and displays it (S724).

At least one embodiment of the invention provides the following advantages. The string input mode conversion button is provided for the mobile terminal, the user may input the string and the service request button in the input mode outputted corresponding to the operation of the string input mode conversion button, the voice telephone call and the Internet service may be performed.

So, the mobile terminal searches the string in the address list of the mobile terminal according to the inputted string and the operation of the call request button and is connected to the terminal of phone number corresponding to the string, therefore, the user may search the address list and request the call in a few operations of the buttons.

Also, according to the string and the Internet service request button operation inputted by the user, if the string is the domain address, the web service may be connected to the domain address, or if the string is the search word, the search result by the location base service may be outputted by employing the location of the mobile terminal and the search word.

In addition, though the string inputted by the user is the same, other information may be provided according to the wireless Internet access function key inputted by the user. So, it is more likely that the user is provided preferentially with the wanted information.

Furthermore, the corresponding site may be accessed in a few steps and the wanted site and the wanted information may be accessed faster and more easily by the string and the function key inputted in the mobile terminal. While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. A method of providing a wireless Internet service to a mobile terminal, comprising:
   receiving a wireless Internet access service request signal including at least a string and information corresponding to a wireless Internet access key from the mobile terminal;
   determining whether or not a predetermined service distinguisher is included in the wireless Internet service access request signal;
   extracting the string and the information corresponding to the wireless Internet access key if the predetermined service distinguisher is included in the wireless Internet service access request signal;
   obtaining information corresponding to the string;
   reorganizing the obtained information according to priority based on information corresponding to the wireless Internet access key; and
   transmitting the reorganized information to the mobile terminal.

2. The method of claim 1, wherein the information corresponding to the wireless Internet access key is a numeral or a character.

3. The method of claim 1, wherein the obtaining comprises extracting the information corresponding to the string from a database in the server.

4. The method of claim 1, wherein the obtaining comprises:
   requesting the information corresponding to the string to at least one information providing server; and
   receiving the information corresponding to the string from the at least one information providing server.

5. The method of claim 4, wherein the reorganizing comprises organizing the information, except the determined information belonging to the priority level, as directory.

6. The method of claim 1, wherein with multimedia data corresponding to the inputted wireless Internet access key, the reorganized information is provided to the user through the mobile terminal.

7. The method of claim 6, wherein the multimedia data comprise at least one chosen from an image, a sound and a perfume.

8. A method of providing a wireless Internet service to a mobile terminal, comprising:
   receiving a wireless Internet access service request signal including at least a string and a wireless Internet access key identifier from the mobile terminal;
   determining whether or not a predetermined service distinguisher is included in the wireless Internet service access request signal;
   extracting the string and the wireless Internet access key identifier if the predetermined service distinguisher is included in the wireless Internet service access request signal;
   requesting the information corresponding to the string to a information providing server corresponding to the wireless Internet access key identifier;
   receiving the information corresponding to the string from the information providing server; and
   transmitting the information corresponding to the string or the information organized from the information corresponding to the string to the mobile terminal.

9. The method of claim 8, wherein the wireless Internet access key identifier is a numeral or a character.

10. The method of claim 8, further comprising reorganizing the information corresponding to the string received from the information providing server according to a predetermined priority.

11. The method of claim 8, wherein the information providing server is preferentially corresponding to any one out of a plurality of wireless Internet access function keys.

12. A computer-readable medium including a program containing computer-executable instructions for performing the method of providing a wireless Internet service to a mobile terminal, wherein the method comprises:
   receiving a wireless Internet access service request signal including at least a string and a wireless Internet access key identifier from the mobile terminal;
   determining whether or not a predetermined service distinguisher is included in the wireless Internet service access request signal;
   extracting the string and the wireless Internet access key identifier if the predetermined service distinguisher is included in the wireless Internet service access request signal;
   requesting the information corresponding to the string to an information providing server corresponding to the wireless Internet access key identifier;
   receiving the information corresponding to the string from the information providing server; and
   transmitting the information corresponding to the string or the information organized from the information corresponding to the string to the mobile terminal.

13. A system for providing a wireless Internet service to a mobile terminal, comprising:
   a gateway server configured to receive a wireless Internet access service request signal including at least a string and a wireless Internet access key identifier from the mobile terminal and determine whether or not a predetermined service distinguisher is included in the wireless Internet service access request signal; and an analysis server configured to receive the string and the wireless Internet access key identifier from the gateway server and provide the string and the information corresponding to the wireless Internet access key identifier to the mobile terminal, wherein the analysis server comprises a string extracting portion configured to extract the string and the wireless Internet access key identifier; and an information organizing portion configured to obtain the information corresponding to the string and reorganize the obtained information according to priority based on the wireless Internet access key identifier.

14. The system of claim 13, wherein the analysis server further comprises a transmitting/receiving portion configured to request the information corresponding to the string to at least one information providing server and receive it from the at least one information providing server and provide it to the information organizing portion.

* * * * *